United States Patent
Vontobel et al.

(10) Patent No.: US 10,878,174 B1
(45) Date of Patent: Dec. 29, 2020

(54) ADVANCED TEXT TAGGING USING KEY PHRASE EXTRACTION AND KEY PHRASE GENERATION

(71) Applicant: Starmind AG, Kusnacht (CH)

(72) Inventors: Marc Vontobel, Meilen (CH); Stijn Vermeeren, Zurich (CH); Joachim Ott, Zurich (CH)

(73) Assignee: Starmind AG, Zurich (CH)

( * ) Notice: Subject to any disclaimer, the term of this patent is extended or adjusted under 35 U.S.C. 154(b) by 0 days.

(21) Appl. No.: 16/910,891

(22) Filed: Jun. 24, 2020

(51) Int. Cl.
| | |
|---|---|
| *G06F 40/30* | (2020.01) |
| *G06F 40/117* | (2020.01) |
| *G06F 40/284* | (2020.01) |
| *G06N 20/00* | (2019.01) |
| *G06F 16/951* | (2019.01) |
| *G06N 5/04* | (2006.01) |

(52) U.S. Cl.
CPC .......... *G06F 40/117* (2020.01); *G06F 16/951* (2019.01); *G06F 40/284* (2020.01); *G06N 5/04* (2013.01); *G06N 20/00* (2019.01)

(58) Field of Classification Search
CPC ........ G06N 20/00; G06N 3/08; G06F 40/117; G06F 40/284
See application file for complete search history.

(56) References Cited

U.S. PATENT DOCUMENTS

| | | | |
|---|---|---|---|
| 5,724,594 A | 3/1998 | Pentheroudakis | |
| 7,269,544 B2 | 9/2007 | Simske | |
| 8,533,208 B2 | 9/2013 | Sundaresan | |
| 8,650,177 B2 | 2/2014 | Skomoroch | |
| 8,700,599 B2* | 4/2014 | Udupa | G06Q 30/0251 707/709 |
| 8,751,218 B2 | 6/2014 | Dang | |
| 9,424,524 B2 | 8/2016 | Dave | |
| 10,191,951 B1 | 1/2019 | Bronstein | |
| 10,223,646 B1* | 3/2019 | Vontobel | G06Q 10/06311 |
| 2005/0125216 A1* | 6/2005 | Chitrapura | G06F 40/30 704/1 |
| 2009/0254540 A1* | 10/2009 | Musgrove | G06F 16/31 |
| 2012/0117092 A1* | 5/2012 | Stankiewicz | G06F 16/3329 707/755 |
| 2015/0317303 A1* | 11/2015 | Zhang | G06F 40/40 707/776 |
| 2016/0170965 A1* | 6/2016 | Gerard | G06F 40/247 704/9 |

FOREIGN PATENT DOCUMENTS

| | | |
|---|---|---|
| CA | 2777520 | 4/2011 |
| EP | 0952533 | 10/1999 |
| EP | 1217533 | 6/2002 |

* cited by examiner

*Primary Examiner* — Jialong He
(74) *Attorney, Agent, or Firm* — Sheppard Mullin Richter & Hampton LLP

(57) ABSTRACT

The systems and methods described herein describe a comprehensive knowledge and/or skills management technology tool to address these and other issues with an advanced text tagging algorithm to extract the relevant topics from a text segment. The tagging algorithm includes a key phrase extraction technique and a key phrase generation technique. The key phrase extraction includes identifying phrases from the original text that represents its most relevant information. The key phrase generation technique includes generating additional phrases that do not necessarily appear in the text, but which describe its subject.

22 Claims, 9 Drawing Sheets

ADVANCED TEXT TAGGING USING KEY PHRASE EXTRACTION AND KEY PHRASE GENERATION

FIELD OF THE INVENTION

The systems and methods described herein relate to machine learning-based approaches for resolving user queries via a dynamic determination and allocation of expert resources with an advanced text tagging algorithm that processes a text segment using key phrase extraction and key phrase generation.

BACKGROUND OF THE INVENTION

Conventional approaches to mapping and identifying expert resources suffers from one or more drawbacks. For example, in large organizations, the number of users and volume of content can make mapping and identifying expert resources problematic. Models of an organization's expert resources may be unable to factor in all of the available data and differentiate between users with a similar background or level of expertise. Maintaining an up-to-date model is also often difficult as people constantly acquire new knowledge and shift focus between different specializations. These problems are further exacerbated in multi-national organizations where the use of different languages makes mapping and identifying expert resources across different regions challenging. Furthermore, even when the ideal resource is identified, the identified individual may not be available or incentivized to respond. In some cases, an answer to a question already exists within the enterprise, but the existence of the question and answer is not readily known to the user. These and other drawbacks exist with conventional solutions.

SUMMARY OF THE INVENTION

The systems and methods described herein describe a comprehensive knowledge and/or skills management technology tool to address these and other issues with an advanced text tagging algorithm to extract the relevant topics from a text segment. The tagging algorithm includes a key phrase extraction technique and a key phrase generation technique. The key phrase extraction includes identifying phrases from the original text that represents its most relevant information. The key phrase generation technique includes generating additional phrases that do not necessarily appear in the text, but which describe its subject.

According to one aspect of the invention, the system may provide a set of technologies, that work together as one solution, to effectively and efficiently resolve user queries. The cognitive engine autonomously learns which experts have the knowledge to quickly solve a question or whether a previous question is similar enough to provide a solution instantly. The system uses predictive analytics to find those individuals who can best answer a particular question at the time a question is generated as well as using autocomplete suggestions and automatically searching for similar previously stored questions while the user is inputting a question. In this way, if an answer to the question exists in the system, the system can provide that information to the user. If it is a new question, the system can make a real-time, dynamic determination of who can be respond to the question at that time. These technologies may be used for other applications involving the identification of experts (e.g., project staffing for new projects). The technologies may also be useful for skills management (e.g. if an HR department desires to assess the skills/skills gap for employees).

According to one aspect of the invention, the system uses machine learning to create a know-how map, linking all of its users with their areas of expertise. The system may use unsupervised learning techniques, which are automated and require no human effort. The learning algorithms automatically adapt themselves to the different topics and use-cases that occur in different organizations. In this way, the system creates a dynamically changing knowledge and user map.

The expert resources of an organization or group of users may be mapped by determining connections between topics (i.e., tags) and calculating an expert score related to each topic for each user. These connections are subsequently used during the expert routing for each new question, to find those users with the expertise to give the best solutions. In various implementations, the expert resources may be mapped based on a record of prior interactions with the system by each user. From the record of prior interactions with the system, indications of interest and expertise in one or more topics may be identified and used to calculate an expert score for each user in each topic. For example, an indication of interest in a topic may comprise viewing prior questions received by the system related to the topic or performing a search related to the topic, and an indication of expertise in a topic may comprise a contribution related to that topic (e.g., providing questions, solutions, or comments related to that topic) or feedback received from other users regarding content the user contributed related to that topic.

A user's expert score related to a given topic may be calculated based on the indications of interest and expertise for that user related to that topic. The systems and methods described herein may utilize a multi-factor test to calculate expert scores that applies weights to individual indications of interest and expertise based on the type of interaction and the time of the interaction for each of the indications of interest and expertise. For example, indications of expertise in a given topic may be weighted more heavily than indications of interest in that topic when calculating an expert score for that topic. In some implementations, a user's level of interest in a topic may be determined based on identified indications of interest and used to calculate an expert score for that user related to that topic. In various implementations, the record of prior interactions with the system may be monitored and used to automatically update the expert scores for each user related to each topic in real-time. In this way, users interact with the know-how map simply by using the application. The resulting network of questions, tags and users, which are all connected with each other, provides a self-learning map of the know-how of the organization or group of users.

Each topic may correspond to one or more tags. The tags may each comprise a keyword or phrase that identifies the corresponding topic. Each question that is received by the system may be associated with a set of tags. The set of tags may indicate one or more topics related to the question. The tags may be automatically determined and/or determined based on user input indicating one or more tags to associate with the question. In some implementations, tags to associate with a question may be automatically determined based on keywords found in the question itself, one or more similar questions previously submitted, and/or connections mapped between one or more tags identified for the question and related tags.

In various implementations, one or more expert users to route the question may be identified based on the set of tags associated with the question and the expert scores for each user related to the set of tags. In doing so, users may be identified whose expertise best matches the particular combination of tags associated with the question. In some implementations, users identified as an expert user to route a question may be identified from a set of users based on the workload of each of the set of users (i.e., load balancing). By analyzing the activity of different users by time and day of the week, the system can alert those experts for a new question who are likely to be available to provide a solution without delay. In doing so, the systems and methods described herein may make sure that the highest scoring experts are not demotivated by receiving too many questions. In some implementations, the user identified as the expert user to route the question may be identified from a set of users based on the language proficiencies of each of the set of users. The user identified as the expert user may be provided with the question and prompted to provide a solution.

Combining all of these factors, the systems and method described herein may obtain an ordered list of users identified as expert users. The ordered list of users may represent the top experts (i.e., the users with the highest expert score) for a given question at a given time. One or more of the identified expert users may be alerted and provided with the question. For example, in some implementations, between four and ten expert users identified for a question may be provided with the question to maximize the likelihood of getting a quality solution or answer to the question as soon as possible.

According to one aspect of the invention, an advanced text tagging algorithm is used to extract the relevant topics from a text segment of any size. The relevance of a topic may be determined from the content of the text itself, general language and lexical knowledge, and data from the organization where the text originates. More specifically, the advanced text tagging algorithm comprises key phrase extraction and key phrase generation. The key phrase extraction comprises identifying the phrases from the original text that represent its most relevant information. The key phrase generation comprises generating additional phrases that do not appear in the text, but that also describe its subject.

The key phrase extraction may be implemented in a variety of ways. As an example, the key phrase extraction algorithm may be based on part-of-speech tagging. A part-of-speech tag identifies the grammatical role of words in a sentence (e.g., adjective, noun, or verb). Prior to applying part-of-speech tagging, the algorithm may perform language detection to determine the language of the text, sentence splitting to split the text into sentences, and tokenization to obtain the tokens of each sentence and obtain part-of-speech tag for the tokens.

After obtaining the corresponding part-of-speech tag for each token, the key phrase extraction algorithm identifies the key phrase candidates, including for example:
  noun phrases composed of single or consecutive nouns in the text,
  noun-preposition-noun
  gerunds that act as a noun, such as in problem solving.
  adjectival phrases, such as artificial intelligence,
  past participle construction, where the past participle on its own acts as an adjective, such as in distributed computing and/or
  other filter criteria.
The algorithm filters the resulting key phrase candidates, generates a score and selects the most relevant ones. The foregoing are illustrative only and the invention is not limited to these criteria.

The algorithm may also distinguish between relevant adjectival phrases (e.g., Artificial Intelligence), and irrelevant adjectival phrases (e.g., Good Idea). Relevance of adjectival phrases may be based on a determination of whether they appear in an electronic resource (e.g. an online encyclopedia database). In various implementations, the system uses one or multiple online encyclopedia databases. An example of such an online encyclopedia database is the Wikidata collection. The system uses the whole phrase only if it is in the encyclopedia database, and otherwise, it only uses the nouns in the phrase (e.g., Idea from Good Idea).]

Once the system determines a final list of candidates, the algorithm scores the candidates to select the most relevant ones. The scoring may be based on some or all of the following criteria:
  The total occurrences of the phrase in the text—the more often it appears, the more relevant it is
  The position in the text—phrases at the beginning of the text are more relevant that those that appear at the end
  Those phrases that appear in the encyclopedia database get an additional boost.
  Phrases that are very common in texts from the client network/Starmind instance/client data are penalized.
  Phrases that are very common in the language in general are also penalized.
The goal of applying a penalty in the last two criteria is twofold: it prevents the algorithm from continuously suggesting the same common key phrases and it gives priority to more specific terms to be suggested instead of more common ones. The penalty may be based on the frequency of the term in the network or in the language.

The tagging algorithm may also take into account which tags are already used in a particular instance (e.g., an instance for a particular entity, overall use in the system across instances or otherwise). If a candidate tag (phrase) and an existing tag in an entity's instance have a small edit distance, then the existing tag will be returned, rather than creating a new tag. The edit distance used is an adaptation of the Levenshtein distance. The advantages are the flexibility to deal with minor typos in the input text and singular and plural forms of the same word (or other inflections) are mapped to the same tag.

To avoid associating syntactically similar words which nevertheless have a completely different meaning (such as revenge and revenue), the algorithm checks a built-in dictionary and rejects word pairs which are both included in the dictionary but have different lemmas.

The top-scored phrases will be part of the final tag suggestion, together with the output of the key phrase generation.

The key phrase generation may be implemented in a variety of ways. As one example, the key phrase generation algorithm may be based on suggesting hypernyms. Hypernyms are terms that group a set of words (hyponyms) by meaning. For example, Red, Blue, and Green are all hyponyms of the hypernym Color. Suggested hypernyms may be derived from a large database of potential hyponym-hypernym pairs. The algorithm may extract those pairs from an online encyclopedia database such that the encyclopedia article categories are hypernyms, and the pages or categories under each category, the corresponding hyponyms. The system prefilters the final list of online encyclopedia pages for this purpose by total of page views, and total of tokens, since very long hypernyms are often unnecessarily descriptive.

Given a set of key phrases, the algorithm identifies a hypernym candidate if there are at least two associated hyponyms among the set of key phrases. Once the hypernym candidates are identified, the algorithm selects one based on a determination of relevance. As one example, relevance may be determined using at least some of the following factors, which may be defined by and implemented in the following order:

- Total input key phrases coverage—e.g., if a candidate is the hypernym of 3 key phrases, it has priority over another that covers only 2
- Total occurrences of the hyponyms in the language, where the lower, the better.
    - For example, a hypernym candidate that covers the key phrase Word, which appears very often in the English text, is ranked lower than other candidates that cover key phrases with less occurrences, such as Microsoft or Investment.
- The total of views (page view counter) of their corresponding online encyclopedia page.

Then the algorithm goes through the sorted candidates sequentially and adds a hypernym in the final suggestion if at least one of the hyponyms covered by the candidate was not covered by any of the previously suggested hypernyms.

Different approaches may be used to suggest hypernyms, including the following:

- Tag Suggestion hypernyms: the key phrases suggested from key phrase extraction are used to identify hypernyms
    - Suggestion of direct hypernyms: the algorithm suggests the hypernyms of the given list of key phrases.
    - Suggestion of transitive hypernyms: the algorithm suggests the hypernyms of hypernyms of the given list of key phrases.
- User-context hypernyms: the user's expertise is defined as his/her top-linked tags. In this approach, the expertise of the user associated with the text is combined with the key phrases suggested from key phrase extraction.

These and other objects, features, and characteristics of the system and/or method disclosed herein, as well as the methods of operation and functions of the related elements of structure and the combination thereof, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.

According to one aspect of the invention, an advanced text tagging algorithm is used to extract the relevant topics from a text segment of any size. The relevance of a topic may be determined from the content of the text itself, general language and lexical knowledge, and data from the organization where the text originates.

Figure 9:
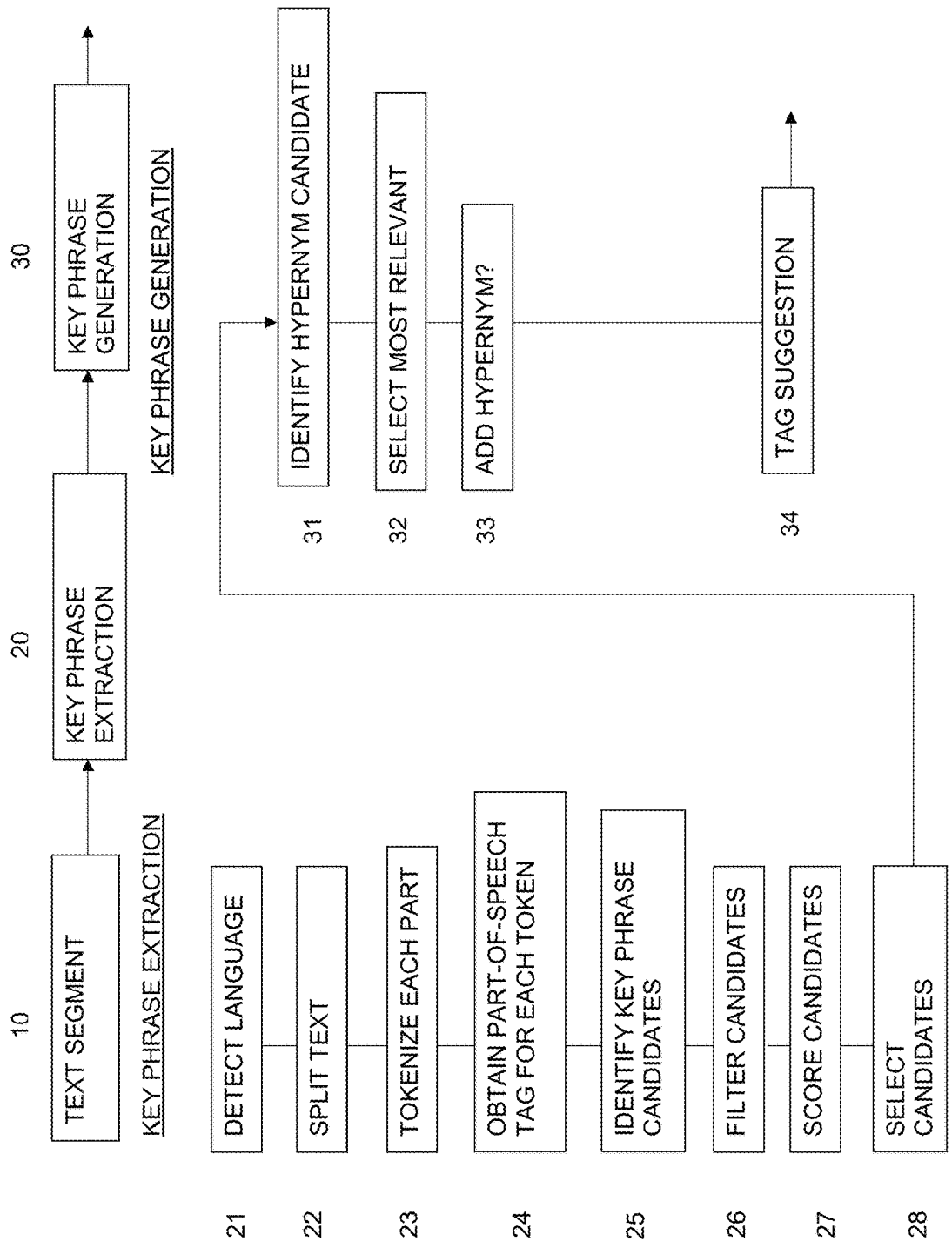
FIG. 9 illustrates an example of a key phrase extraction technique and a key phrase generation technique, in accordance with one or more implementations.

As shown for example in FIG. 9, the advanced text tagging algorithm may process a text segment 10, using key phrase extraction 20 and key phrase generation 30. The key phrase extraction comprises identifying the phrases from the original text that represent its most relevant information. The key phrase generation comprises generating additional phrases that do not appear in the text, but that also describe its subject.

The key phrase extraction may be implemented in a variety of ways. As an example, the key phrase extraction algorithm may be based on part-of-speech tagging. A part-of-speech tag identifies the grammatical role of words in a sentence (e.g., adjective, noun, or verb). Prior to applying part-of-speech tagging, the algorithm may perform language detection 21 to determine the language of the text, sentence splitting 22 to split the text into sentences (or other segments), and tokenization 23 to obtain the tokens of each sentence (or other segment) and obtain part-of-speech tags for the tokens 24.

After obtaining the corresponding part-of-speech tag for each token, the key phrase extraction algorithm identifies the key phrase candidates 25, including:

- noun phrases composed of single or consecutive nouns in the text,
- gerunds that act as a noun, such as in problem solving.
- adjectival phrases, such as artificial intelligence,
- past participle construction, where the past participle on its own acts as an adjective, such as in distributed computing.

The algorithm filters the resulting key phrase candidates 26, generates a final score for the key phrase candidates 27 and selects the most relevant ones 28. Examples of filtering, scoring and selecting are detailed below.

The models used for part-of-speech tagging and the methods to detect such grammatical constructions may be language dependent. For example, adjectives precede a noun in English, but they usually follow it in other languages, such as Spanish. Language identification is a well-studied problem in machine learning, and being able to identify the correct language for a text is especially important in cases where the text contains foreign words or phrases. For example, a German text containing Natural Language Processing should still be identified as German. For the language detection task, the algorithm uses character-level n-gram models. However, these models are not particularly good with mixed language inputs. For this purpose, the algorithm boosts the language that contains most of the stop words in the text.

After obtaining the key phrase candidates, the system may identify for certain languages whether, for example, a detected sequence of consecutive nouns, or an adjective preceding a noun belong to the same noun phrase. For example, in the sentence They teach the students machine learning, the noun phrases students and machine learning, belong to two different noun phrases. To be able to identify and process such cases, the algorithm uses dependency parsing, which gives us the syntactic structure of the input text. This way, the system can identify students as an independent phrase of machine learning, which, in its turn, machine depends on learning.

The algorithm may also distinguish between relevant adjectival phrases (e.g., Artificial Intelligence), and irrelevant adjectival phrases (e.g., Good Idea). Relevance of adjectival phrases may be based on a determination of whether they appear in the online encyclopedia database. The system uses the whole phrase only if it is in the encyclopedia database, and otherwise, it only uses the nouns in the phrase (e.g., Idea from Good Idea).]

The online encyclopedia databases that are used may be prefiltered to avoid false positives. By way of example, the online encyclopedia database may include Wikidata, which will be referenced by way of example only. The invention is not so limited. Any reference to Wikidata or other online encyclopedia database can be substituted by other online encyclopedia database or other online data collection. In various implementations, the Wikidata collection is used as such a database and is prefiltered with some or all of the following steps:
  by instance: the system drops entities from among a blacklisted set of instances (e.g. books, movies, bands) to avoid tags of very commonly used phrases in everyday language (e.g. 'little bit', 'right time', 'next year') that exist as a band, book, or movie title.
  by statement count: this avoids unreasonable tags coming from unimportant entities. A statement consists of a property-value pair, for example, for the entity "Berlin", it could have the statements "location: Germany" and "instance of: city".
  by language count
  by wikipedia language instance: the system drops entities with no wikipedia article in any of the whitelisted languages
  to avoid tags from wikiquote, wikibooks, wikitravel, etc.
Some further filtering criteria were defined based on the
  phrase morphology.
  by phrase length
  by allowed characters: the system drops phrases with any characters but letters, whitespace, and hyphen.
Some additional phrases are included in the accepted set of tags:
  including the aliases for the whitelisted languages (with the same morphological constraints as described above).
  including Wikidata category pages]

Once the system determines a final list of candidates, the algorithm scores the candidates to select the most relevant ones. The scoring may be based on some or all of the following criteria:
  The total occurrences of the phrase in the text—the more often it appears, the more relevant it is
  The position in the text—phrases at the beginning of the text are more relevant that those that appear at the end
  Those phrases that appear in the online encyclopedia databases get an additional boost.
  Phrases that are very common in texts from the client network/Starmind instance/client data are penalized.
  Phrases that are very common in the language in general are also penalized.

The goal of applying a penalty in the last two criteria is twofold: it prevents the algorithm from continuously suggesting the same common key phrases and it gives priority to more specific terms to be suggested instead of more common ones. The penalty may be based on the frequency of the term in the network or in the language.

The tagging algorithm may also take into account which tags are already used in a particular instance (e.g., an instance for a particular entity, overall use in the system across instances or otherwise). If a candidate tag (phrase) and an existing tag in an entities instance have a small edit distance, then the existing tag will be returned, rather than creating a new tag. The edit distance used may be an adaptation of the Levenshtein distance. The advantages are the flexibility to deal with minor typos in the input text and singular and plural forms of the same word (or other inflections) are mapped to the same tag. Other edit distance metrics may be used.

To avoid associating syntactically similar words which nevertheless have a completely different meaning (such as revenge and revenue), the algorithm checks a built-in dictionary and rejects word pairs which are both included in the dictionary but have different lemmas.

The top-scored phrases will be part of the final tag suggestion, together with the output of the key phrase generation.

The key phrase generation may be implemented in a variety of ways. As one example, the key phrase generation algorithm may be based on suggesting hypernyms. Hypernyms are terms that group a set of words (hyponyms) by meaning. For example, Red, Blue, and Green are all hyponyms of the hypernym Color. Suggested hypernyms may be derived from a large database of potential hyponym-hypernym pairs. The algorithm may extract those pairs from online encyclopedias, for example Wikipedia, such that encyclopedia categories are hypernyms, and the pages or categories under each category, the corresponding hyponyms. The system prefilters the final list of encyclopedia pages for this purpose by total of page views, and total of tokens, since very long hypernyms are often unnecessarily descriptive.

Given a set of key phrases, the algorithm identifies a hypernym candidate 31 if there are at least two associated hyponyms among the set of key phrases. Once the hypernym candidates are identified, the algorithm selects one (or more)

based on a determination of relevance 32. As one example, relevance may be determined using at least some of the following factors, which may be defined by and implemented in the following order:

Total input key phrases coverage—e.g., if a candidate is the hypernym of 3 key phrases, it has priority over another that covers only 2

Total occurrences of the hyponyms in the language, where the lower, the better.

For example, a hypernym candidate that covers the key phrase Word, which appears very often in the English text, is ranked lower than other candidates that cover key phrases with less occurrences, such as Microsoft or Investment.

The total of views (page view counter) of their corresponding encyclopedia page.

Then the algorithm goes through the sorted candidates sequentially and adds a hypernym 33 in the final suggestion if at least one of the hyponyms covered by the candidate was not covered by any of the previously suggested hypernyms.

Different approaches may be used to suggest hypernyms, including the following:

Tag Suggestion hypernyms: the key phrases suggested from key phrase extraction are used to identify hypernyms Suggestion of direct hypernyms: the algorithm suggests the hypernyms of the given list of key phrases.

Suggestion of transitive hypernyms: the algorithm suggests the hypernyms of hypernyms of the given list of key phrases.

User-context hypernyms: the user's expertise is defined as his/her top-linked tags. In this approach, the expertise of the user associated with the text is combined with the key phrases suggested from key phrase extraction.

The advanced text tagging algorithm for processing a text segment 10, using key phrase extraction 20 and key phrase generation 30 may be used in a variety of ways and for a variety of purposes. One such use is as part of a system 100 configured to map expert resources within an organization or group of users and identify expert resources to route questions based on the mapped expert resources, in accordance with one or more implementations as described below. Other applications of the algorithm will be apparent. For example, these technologies may be used for other applications involving the identification of experts (e.g., project staffing for new projects), skills management (e.g. if an HR department desires to assess the skills/skills gap for employees) and/or other applications.

Overview of System Architecture

Figure 1:
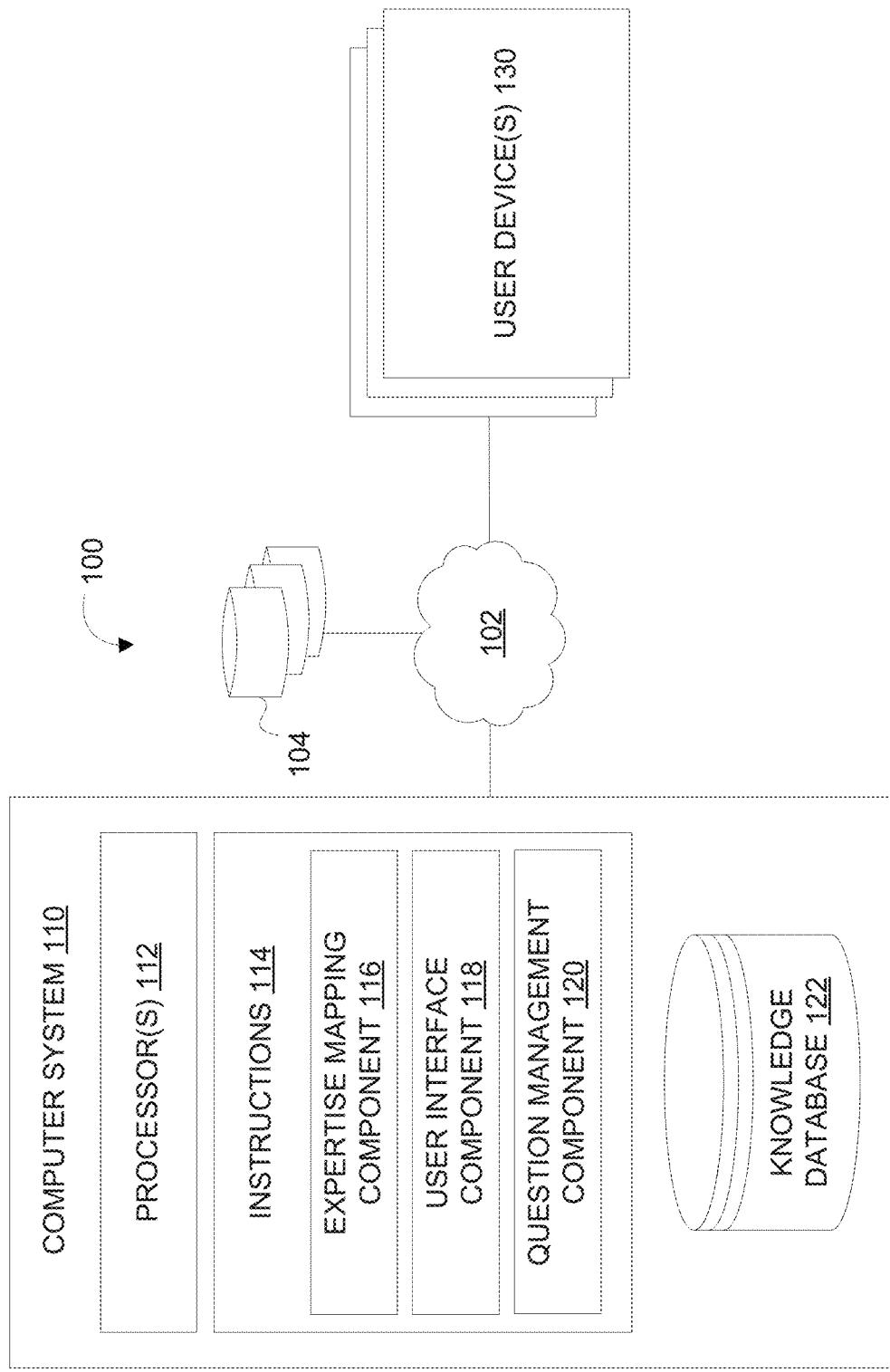
FIG. 1 illustrates an example of an overview of a system configured to map expert resources within an organization or group of users and identify expert resources to route questions based on the mapped expert resources, in accordance with one or more implementations.

FIG. 1 illustrates an overview of a system 100 configured to map expert resources within an organization or group of users and identify expert resources to route questions based on the mapped expert resources, in accordance with one or more implementations. The system 100 may include databases 104, a computer system 110, one or more user device(s) 130, and/or other components. The system 100 may interface with one or more external entities (e.g., one or more user device(s) 130) via a network 102. The computer system 110 may include one or more physical processor(s) 112, instructions 114, a knowledge database 122, and/or one or more one or more other components.

The one or more physical processor(s) 112 may be configured to provide information processing capabilities in system 100. As such, the processor(s) 110 may comprise one or more of a digital processor, an analog processor, a digital circuit designed to process information, a central processing unit, a graphics processing unit, a microcontroller, an analog circuit designed to process information, a state machine, and/or other mechanisms for electronically processing information.

Processor(s) 112 may be configured to execute one or more computer readable instructions 114. Computer readable instructions 114 may include one or more computer program components. For example, computer readable instructions 114 may include one or more of an expertise mapping component 116, a user interface component 118, a question management component 120, and/or other computer program components. As used herein, for convenience, the various computer readable instructions 114 will be described as performing an operation, when, in fact, the various instructions program the processor(s) 112 (and therefore system 100) to perform the operation.

Expertise mapping component 116 may describe and represent the functionality of a cognitive engine that autonomously maps the expert resources within an organization or group of users. Expertise mapping component 116 may be configured to continuously learn and interface with question management component 120 to identify which experts have the knowledge to quickly solve a question or whether a previous question is similar enough to provide a solution instantly. Using the mapped resources, system 100 may be configured to utilize predictive analytics to find those individuals who can best answer a particular question at the time a question is generated as well as using autocomplete suggestions and automatically searching for similar previously stored questions while the user is inputting a question. In this way, if an answer to the question exists in the system, the system can provide that information to the user. If it is a new question, the system can make a real-time, dynamic determination of who can respond to the question at that time.

Expertise mapping component 116 may include computer program instructions, which specifically program the processor(s) 112 to map the expertise of an organization or group of users. The expertise of the organization or group of users may comprise the collection of human resources with a demonstrated and/or predicted expertise in a plurality of topics and sub-topics. The expertise mapping component 116 is further described in connection with FIG. 2.

Figure 2:
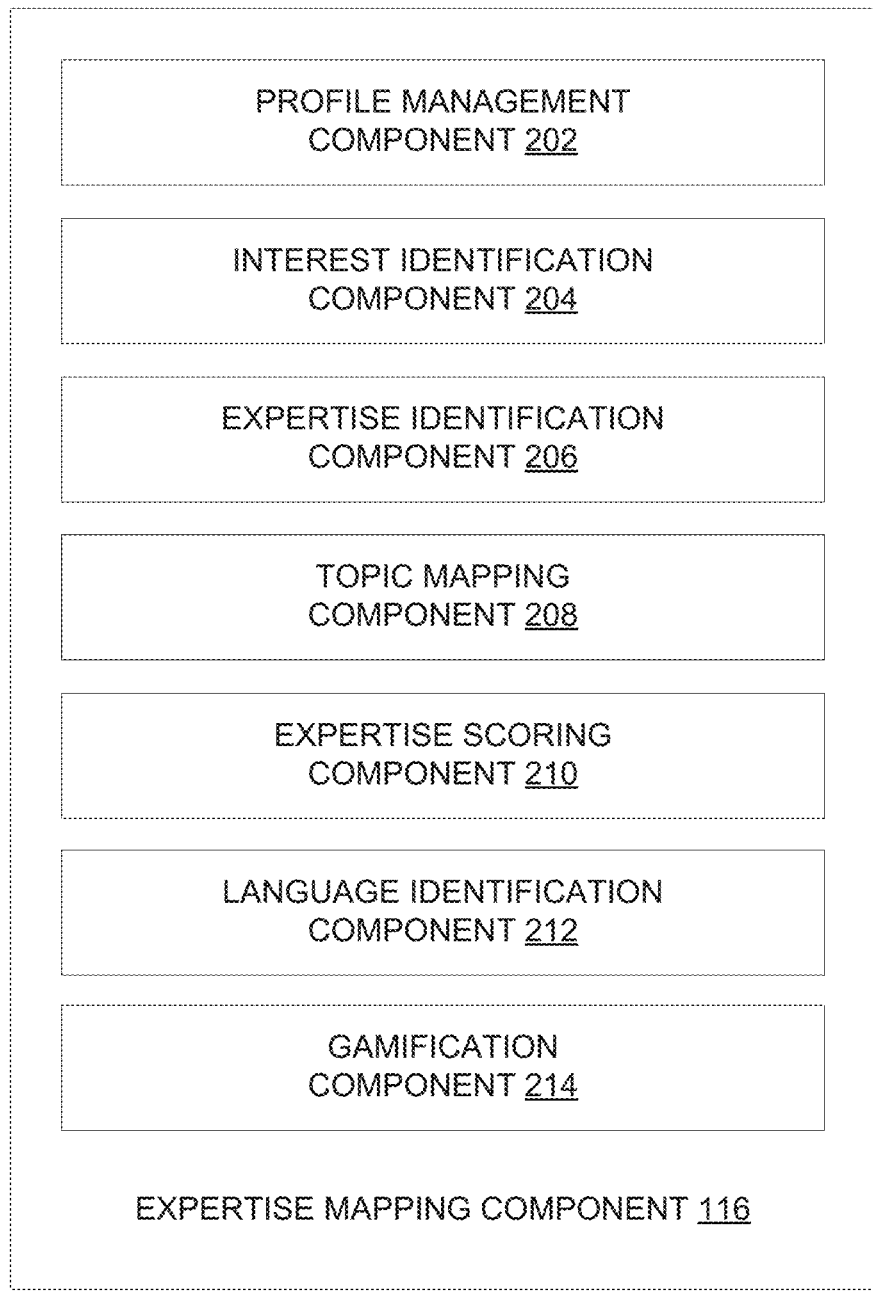
FIG. 2 illustrates an example of a block diagram of an expertise mapping component configured to map the expertise of an organization or group of users, in accordance with one or more implementations.

FIG. 2 illustrates a block diagram of expertise mapping component 116 configured to map the expertise of an organization or group of users, in accordance with one or more implementations. The various components of expertise mapping component 116 depict various sets of functions that may be implemented by computer program instructions of expertise mapping component 116. Expertise mapping component 116 may be configured to program computer system 110 to map the expertise of an organization or group of users using all or a portion of the components of expertise mapping component 116 illustrated in FIG. 2.

Expertise mapping component 116 may include a profile management component 202, an interest identification component 204, an expertise identification component 206, a topic mapping component 208, an expertise scoring component 210, a language identification component 212, a gamification component 214, and/or other components. One or more of profile management component 202, interest identification component 204, expertise identification component 206, topic mapping component 208, expertise scoring component 210, language identification component 212, and gamification component 214 may be coupled to one another or to components not shown in FIG. 2.

Profile management component 202 may be configured to manage user profiles for users of system 100. The users of system 100 may comprise a set of users. For example, the users of system 100 may comprise a predefined set of users with access to system 100. In some implementations, the users of system 100 may comprise individual members of an organization or predefined group of users. In some implementations, profile management component 202 may be configure to manage the on-boarding of user to system 100. For example, profile management component 202 may be configured to create a profile for one or more users. A profile of a user may include user profile information. User profile information may comprise user identifying information (e.g., name, position, location, contact information, a user identification number, and/or other user identifying information), one or more expert scores for the user each related to one or more of a plurality of topics, the language proficiencies of the user, game information for the user (such as a level, a number of points, and/or other game information), communication preference information indicating preferred means of communication for each user, and/or other user profile information. In various implementations, profile management component 202 may be configured to interface with various components of system 100 in order to obtain and/or provide information related to one or more users. In some implementations, profile management component 202 may be configured to obtain information from knowledge database 122 to create, update, or otherwise manage user profiles.

In some implementations, profile management component 202 may be configured to identify and/or modify a user level for each user. For example, user levels may comprise employee users, management users, administrative users, and/or other user types. In some implementations, only one or more of the user levels may invite other users (i.e., grant other users access to system 100). For example, in some implementations, only management users and/or administrative users may invite other users to system 100. In some implementations, an employee user may comprise a typical user of system 100. An employee user may be able to view questions, solutions, and comments submitted to system 100, submit questions to system 100, and/or otherwise interact with system 100. For example, in some implementations, an employee user may be permitted to access, or have their access limited to, one or more functions of a question-answer module, one or more optional standard extensions, a know-how profile, account settings, and/or other aspects of system 100.

An employee user may utilize a question-answer module to (i) ask and/or resolve questions; (ii) add file attachments, links and videos to questions and solutions; (iii) perform full text searches for existing questions and solutions; (iv) receive notifications (e.g., notifications that the user has been identified as an expert user and routed one or more questions, notifications that an question has been answered, and/or other notifications); (v) accept or reject questions; (vi) provide commentary related to questions and/or solutions; (vii) provide feedback related to one or more solutions (e.g., on a scale of 1-5 stars); (viii) review questions previously asked and/or answered; (iv) recommend users as expert users to answer questions; and/or otherwise interact with system 100 related to one or more questions or solutions.

Standard extensions may comprise the ability to view usage terms and conditions that users must accept, report questions as inappropriate, access an email form for feedback and support queries, answer a time saving survey, access gamification features, and/or one or more features of other extensions. The know-how profile may comprise a graphic visualization of one's own areas of expertise, an overview of one's own network activity, and/or enable a user to search for other users based on their know-how profile. Access to account settings may enable an employee user to view or modify personal information, email/notification settings, language settings for emails and user interface, language filtering for questions, and/or other account settings.

In some implementations, a management user may be permitted to access one or more functions accessible by employee users and one or more additional functions. For example, a management user may be permitted to access, or have their access limited to, one or more of a know-how wheel, expert searches that show the top experts for one or more topics (e.g., the top 20 experts for a topic), interaction analytics for one or more users of system 100 (e.g., time to solution, percentage of solved questions, average rating, number of questions answered, solved, or commented on, and/or other interaction statistics), and/or other aspect of system 100. In some implementations, management users may have access to "tag clouds," an indication of the user with the best expert score for a topic, "white spots," and/or other information.

In some implementations, an administrative user may be permitted to access one or more functions accessible by employee users, management users, and one or more additional functions. For example, administrative users may identify other administrative users, add, modify, or delete user data, import data, export data, access questions (modify, remove, etc.), process and deactivate content (questions, solutions, commentary), add pictures to keywords, upgrade comments to solutions, view analytics, export analytics, and/or one or more additional functions.

Interest identification component 204 may be configured to identify indications of interest in one or more of a plurality of topics for each of the set of users. For example, a user's interest in a particular topic may be determined based on content the user looks at or searches for, without necessarily contributing to (e.g., providing solutions to questions related to the topic), related to that topic. In various implementations, an indication of interest in a topic may comprise one or more views of prior questions received by the system related to the topic, one or more searches related to the topic, and/or one or more other prior interactions of a user indicating an interest in a topic.

In various implementations, interest identification component 204 may be configured to access a record of prior interactions with the system for each user to identify indications of interest in one or more of a plurality of topics for each user. For example, interest identification component 204 may be configured to identify indications of interest in one or more of a plurality of topics for each of the set of users based on a record of prior interactions by each of the users with system 100 stored in knowledge database 122. In various implementations, interest identification component 204 may be configured to identify indications of interest in a given topic based on a viewing history for each user indicating one or more views of prior questions, solutions, and/or comments related to the topic and/or a search history indicating one or more searches related to the topic. In some implementations, the search history may comprise an indication of one or more searches within the system or a record of searches accessible by the system.

In various implementations, interest identification component 204 may be configured to identify indications of interest from a record of prior interactions by identifying one or more keywords, one or more tags, and/or one or more topics within the record of prior interactions. In some implementations, interest identification component 204 may be configured to utilize a map of topics and tags to identify an indication of an interest in a given topic from a prior interaction based on one or more tags identified for the prior interaction. In other words, interest identification component 204 may be configured to determine that a prior interaction is an indication of an interest in a given topic because one or more tags identified in the prior interaction correspond with the given topic. In various implementations, interest identification component 204 may be configured to monitor a record of prior interactions and identify indications of interest in real-time.

In various implementations, interest identification component 204 may be configured to provide indications of interest in one or more topics identified for each user to profile management component 202 and/or expertise scoring component 210. In some implementations, the indications of interest in one or more topics provided may include a date and/or time associated with the indication of interest. Profile management component 202 may be configured to store the received indications of interest in one or more topics identified for each user in a user profile for each user. Expertise scoring component 210 may be configured to determine a level of interest in the one or more topics for each user and calculate an expert score for each of the one or more topics for each user based on the received indications of interest in the one or more topics.

Expertise identification component 206 may be configured to identify indications of expertise in one or more of a plurality of topics for each of the set of users. For example, a user's expertise in a particular topic may be determined based on content the user has contributed related to that topic (such as questions, solutions to questions, or comments related to questions or solutions the user has provided related to that topic), and the feedback the user receives for the content they have contributed (e.g., feedback from another user that provided a question to the system for a solution the user provided for that question). As such, in various implementations, an indication of expertise in a topic may comprise contributions related to that topic (e.g., questions, solutions, or comments related to that topic), feedback from other users of the content the user contributed related to that topic, and/or one or more other prior interactions of a user indicating an expertise in a topic.

In various implementations, expertise identification component 206 may be configured to access a record of prior interactions with the system for each user to identify indications of expertise in one or more of a plurality of topics for each user. For example, expertise identification component 206 may be configured to identify indications of expertise in one or more of a plurality of topics for each of the set of users based on a record of prior interactions by each of the users with system 100 stored in knowledge database 122. In various implementations, expertise identification component 206 may be configured to identify indications of expertise in a given topic based on a record of contributions for each user (such as questions, solutions to questions, or comments related to questions or solutions the user has provided related to that topic) and/or a record of feedback the user receives for their contributions.

In various implementations, expertise identification component 206 may be configured to identify indications of expertise from a record of prior interactions by identifying one or more keywords, one or more tags, and/or one or more topics within the record of prior interactions. In some implementations, expertise identification component 206 may be configured to utilize a map of topics and tags to identify an indication of an expertise in a given topic from a prior interaction based on one or more tags identified for the prior interaction. In other words, expertise identification component 206 may be configured to determine that a prior interaction is an indication of an expertise in a given topic because one or more tags identified in the prior interaction correspond with the given topic. In various implementations, expertise identification component 206 may be configured to monitor a record of prior interactions and identify indications of expertise in real-time.

In various implementations, expertise identification component 206 may be configured to provide indications of expertise in one or more topics identified for each user to profile management component 202 and/or expertise scoring component 210. In some implementations, the indications of expertise in one or more topics provided may include a date and/or time associated with the indication of expertise. Profile management component 202 may be configured to store the received indications of expertise in one or more topics identified for each user in a user profile for each user. Expertise scoring component 210 may be configured to calculate an expert score for each of the one or more topics for each user based on the received indications of expertise in the one or more topics.

In various implementations, interest identification component 204 and expertise identification component 206 may be configured to use the techniques described above to identify indications of interest and indications of expertise in one or more topics to identify indications of interest and indications of expertise in one or more subtopics.

In various implementations the system uses one or multiple interfaces (connectors) to other systems used by the organization or group of users, including internal systems within the organization and/or external systems (e.g., online or web-based services). The interfaces transmit data to the system so that the system subsequently can gather information about the users' expertise from this data. Examples of such systems (a non-exhaustive list) are calendar systems, chat and collaboration systems, customer-relationship-management (CRM) systems, storage systems, social collaboration tools, HR information systems, ticketing-tools and other internal and/or external systems from which user data can be obtained.

In some implementations, each data entry sent via these interfaces consists of multiple sections, for example, user identification, a time stamp, one or multiple fields of data containing text that may contain relevant expertise topics. Some implementations may use additional data fields. These data entries are then processed by the system and used to determine or enhance the skill profiles of the users from the group of users. These and other data sources may be used in the various embodiments as described throughout this description to learn about individual employee's skills, knowledge and expertise. Connectors eliminate the problem of a "cold start," which happens when there is no information in the platform about a new user to build them an expertise profile. When connectors are enabled, algorithms can run to automatically create expertise profiles for every user whether or not they have already interacted on the platform. Once a connector is set up, the system will run an initial learning phase and will then continue to learn from the information in this system on an ongoing basis, for example, when new posts are added to a workspace, or new messages are written in a communication channel.

Topic mapping component 208 may be configured to map relationships between topics, subtopics, and/or tags. For example, topics may comprise one or more individuals, groups, places, items, tools, concepts, and/or other subjects relevant to system 100 or the users of system 100. In an exemplary implementation, energy may be a topic. A subtopic of energy may be renewable energy. Subtopics of renewable energy may be hydropower, solar energy, and/or wind power. Each of "energy," "renewable energy," "hydropower," "solar energy," and/or "wind power" may itself comprise a tag. A tag is a keyword or phrase that may be used to identify a topic. In various implementations, topic mapping component 208 may interface with expertise scoring component 210 to map the expert resources of the organization or group of users based on the connections between topics (i.e., tags) and the expert score related to each topic for each user. These connections are subsequently used during the expert routing for each new question, to find those users with the expertise to give the best solutions.

In various implementations, topic mapping component 208 may be configured to use machine learning techniques to create a map of the expert resources (i.e., a know-how map) that links each of the users of system 100 with their areas of expertise. To do so, topic mapping component 208 may be configured to use unsupervised learning techniques and/or semi-supervised learning techniques. In some implementations, topic mapping component 208 may be configured to use unsupervised learning techniques, which are automated and require no human effort. For example, the learning algorithms automatically adapt themselves to the different topics and use-cases that occur in different organizations. In some implementations, topic mapping component 208 may be configured to use semi-supervised learning techniques. In various implementations, topic mapping component 208 may be configured to dynamically update a map of the knowledge among the users of system 100 over-time. In this way, users interact with the know-how map simply by using the application. The resulting network of questions, tags and users, which are all connected with each other, provides a self-learning map of the know-how of the organization or group of users, even if the users are passive on the Q&A platform.

Figure 3:
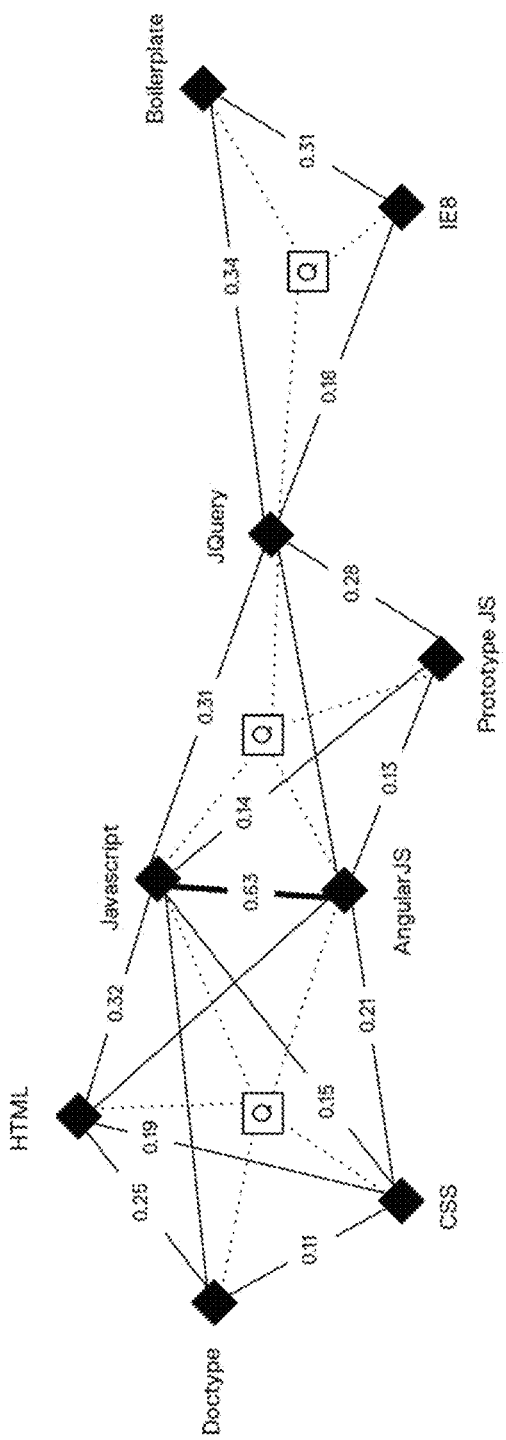
FIG. 3 illustrates an example of how a plurality of topics (or tags) may be connected, in accordance with one or more implementations of the invention.

In various implementations, topic mapping component 208 may be configured to map the connections between individual tags to create clusters of related tags. For example, FIG. 3 illustrates how a plurality of tags may be connected, in accordance with one or more implementations of the invention. In some implementations, topic mapping component 208 may be configured to map the connections between individual tags based on a record of prior questions posed to system 100 and how often different tags are associated with a single question. In some implementations, topic mapping component 208 may be configured to map the connections between individual tags by calculating a score indicating the relatedness of individual tags. The score indicating the relatedness of individual tags may be a rational number or numerical value calculated by topic mapping component 208 based on how often different tags are associated with a single question.

By mapping connections between tags that often occur together, topic mapping component 208 may be configured to create clusters of related tags. The connections between tags make identifying expert users to provide solutions to questions more powerful because it may enable experts to be identified based not only on the expert score for the users for the topic of the question, but also the expert scores for the users in topics that are the most closely related with the topic of the question. In various implementations, topic mapping component 208 may be configured to store information indicating connections between users, tags, and/or topics. For example, topic mapping component 208 may be configured to store a map of all connections between each user and each tag.

In various implementations, topic mapping component 208 may be configured to dynamically update the map of all connections between each user and each tag based on interactions by users with system 100. For example, topic mapping component 208 may be configured to update the map of all connections between each user and each tag based on the tags associated with each question, feedback received related to one or more solutions, and/or other information related to interactions by users with system 100. In various implementations, topic mapping component 208 may be configured to utilize one or more machine learning techniques to automatically update the map of connections between users and tags in real-time.

In some implementations, topic mapping component 208 may be configured to dynamically update the map of all connections between each user and each tag responsive to new tags received by system 100. For example, topic mapping component 208 may be configured to map the connections between each user and a new tag obtained via user input and provided to topic mapping component 208 by question management component 120. Responsive to receipt of a new tag via user input, topic mapping component 120 may be configured to prompt expertise scoring component 210 to determine a level of interest for the new tag for each user and calculate an expert score for the new tag for each user.

Expertise scoring component 210 may be configured to determine a level of interest in each topic for each user and calculate an expert score for each topic for each user. For example, expertise scoring component 210 may be configured to determine a level of interest in each topic for each user and calculate an expert score for each topic for each user based on a record of prior interactions by the users with system 100. In various implementations, expertise scoring component 210 may be configured to determine a level of interest in each topic for each user and calculate an expert score for each topic for each user based on a record of prior interactions by the users with system 100 stored in knowledge database 122. In some implementations, expertise scoring component 210 may be configured to access a record of prior interactions with system 100 in knowledge database 122 to determine a level of interest in each topic for each user and calculate an expert score for each topic for each user. In some implementations, expertise scoring component 210 may be configured to calculate an expert score for a topic for a user based on the level of interest in that topic for that user determined by expertise scoring component 210. In various implementations, expertise scoring component 210 may be configured to determine and update a level of interest in each topic for each user and calculate and update an expert score for each topic for each user based on interactions by the user with system 100 as they occur. In other words, expertise scoring component 210 may be configured to determine a level of interest in each topic for each user and calculate an expert score for each topic for each user in real-time.

In various implementations, expertise scoring component 210 may be configured to determine a level of interest in one or more topics for each user based on indications of interest in the one or more topics. For example, expertise scoring component 210 may be configured to determine a level of interest in one or more topics for each user based on indications of interest in the one or more topics identified by interest identification component 204. The level of interest in each topic for each user may be a rational number or numerical value calculated by expertise scoring component 210. In various implementations, expertise scoring component 210 may be configured to use a multi-factor test to determine a level of interest in one or more topics for each user. In some implementations, expertise scoring component 210 may be configured to determine a level of interest in a topic for a user based on the indications of interest in that topic, the types of indications of interest identified in that topic, and/or the user's level of interest in one or more other topics.

In various implementations, expertise scoring component 210 may be configured to determine a level of interest in one or more topics for each user based on the types of indications of interest identified. For example, types of indications of interest in a topic may comprise one or more views of prior questions, solutions, and/or comments related to the topic, one or more searches related to the topic, and/or one or more other types of indications of interest. In some implementations, expertise scoring component 210 may be configured to determine a level of interest in one or more topics for each user by applying different weights to different types of indications of interest. For example, one or more searches related to a topic may be weighted more heavily than one or more views of prior questions, solutions, and/or comments related to the topic when determining a level of interest in that topic.

In various implementations, expertise scoring component 210 may be configured to determine a level of interest in one or more topics for each user based on the user's level of interest in one or more other topics. In some implementations, the level of interest in a topic across the users of system 100 may be unbounded, but the level of interest across topics for each individual user may be bounded. That is, the total calculated level of interest across topics for each user may be limited to a maximum total level of interest. For example, a user may be equally interested in four topics. As indications of interest in one or more other topics are identified, the user's calculated level of interest in the original four topics will decrease. In some implementations, the user's level of interest in a given topic is represented as a percentage of their interest across topics.

In various implementations, expertise scoring component 210 may be configured to calculate an expert score for each topic for each user based on indications of interest in the one or more topics and indications of expertise in the one or more topics. For example, expertise scoring component 210 may be configured to calculate an expert score for each topic for each user based on indications of interest in the one or more topics identified by interest identification component 204 and indications of expertise identified by expertise identification component 206. The expert score for each topic for each user may be a rational number or numerical value calculated by expertise scoring component 210. In various implementations, expertise scoring component 210 may be configured to use a multi-factor test to calculate an expert score for each topic for each user. In some implementations, expertise scoring component 210 may be configured to calculate an expert score for a given topic for a user based on the indications of interest and indications of expertise identified, the types of indications of interest identified, the types of indications of expertise identified, the date and/or time associated with the indications of interest and indications of expertise, the expert score of other users for that topic, and/or the user's expert score for other topics.

In various implementations, expertise scoring component 210 may be configured to calculate an expert score for a given topic for a user based on the types of indications of interest identified and the types of indications of expertise identified. In some implementations, expertise scoring component 210 may be configured to calculate an expert score for a given topic for a user by applying different weights to different types of indications of interest and different types of indications of expertise. For example, with respect to different types of indications of interest, one or more searches related to a topic may be weighted more heavily than one or more views of prior questions, solutions, and/or comments related to the topic when determining a level of interest in that topic. Types of indications of expertise in a topic may comprise content the user has contributed related to that topic (such as questions, solutions to questions, or comments related to questions or solutions the user has provided related to that topic) and the feedback the user receives for the content they have contributed (e.g., feedback from another user that provided a question to the system for a solution the user provided for that question) and other data sources as described herein. With respect to calculating an expert score for a given topic for a user based on the types of indications of expertise identified, the feedback the user receives for content they have contributed related to that topic may be weighted more heavily than the content the user has contributed itself related to that topic. In various implementations, indications of expertise in a given topic may be weighted more heavily than indications of interest in that topic when calculating an expert score for that topic.

In various implementations, expertise scoring component 210 may be configured to calculate an expert score for a given topic for a user based on the date and/or time associated with the indications of interest and indications of expertise. A user who has been active more recently is more likely to provide an up-to-date solution than a user who has not recently shown an interest in a topic or hasn't made any recent relevant contributions to that topic. As such, expertise scoring component 210 may weight more heavily recent indications of interest and indications of expertise than less recent indications of interest and indications of expertise.

In various implementations, expertise scoring component 210 may be configured to calculate an expert score for a given topic for a user based on the user's expert score for other topics. In some implementations, the expert score for each user across topics may be bounded. In other words, the total knowledge for each user may be bounded. For example, a given user may be knowledgeable about renewable energy. As the user acquires knowledge about new and/or other topics, the user's knowledge about renewable energy may be pushed further back in the user's mind. As such, expertise scoring component 210 may be configured to normalize a given user's expert scores across multiple topics to ensure the sum of the expert scores does not exceed a predefined limit. The predefined limit may comprise an upper bound or a maximum total expert score. In some implementations, expertise scoring component 210 may be configured to weight more recent indications of interest and indications of expertise than less recent indications of interest and indications of expertise when normalizing the user's expert score.

In various implementations, expertise scoring component 210 may be configured to calculate an expert score for a given topic for a user based on the expert score of other users for that topic. In some implementations, the expert score for the users of system 100 may be bounded. In other words, the total knowledge amongst all users of system 100 about a certain topic is bounded. By bounding the total knowledge of the users of system 100 (i.e., the expert scores across the users of system 100), a user posing a question to system 100 may be certain that they are matched with one of a portion of the users of system 100 that qualify as experts in that topic (i.e., one of the most knowledgeable of the users of system 100 for that topic). In some implementations, expertise scoring component 210 may be configured to normalize the expert scores for the users of system 100 for a given topic to ensure the sum of the expert scores does not exceed a predefined limit. The predefined limit may comprise an upper bound or a maximum total expert score. In some implementations, expertise scoring component 210 may be configured to weight more recent indications of interest and indications of expertise than less recent indications of interest and indications of expertise when normalizing the expert scores for a given topic across users.

The distribution of knowledge on a certain topic among all users can be visualized on a pie chart. The total size of the pie represents all knowledge about this topic. Users might lay claim to slices of this pie, representing their share of the total knowledge (e.g. by writing solutions to related questions). As a larger and larger percentage of the pie is claimed, slices corresponding to older contributions gradually decrease in size. In some implementations, a part of the pie may always be available to be awarded to new contributions.

Figure 4:
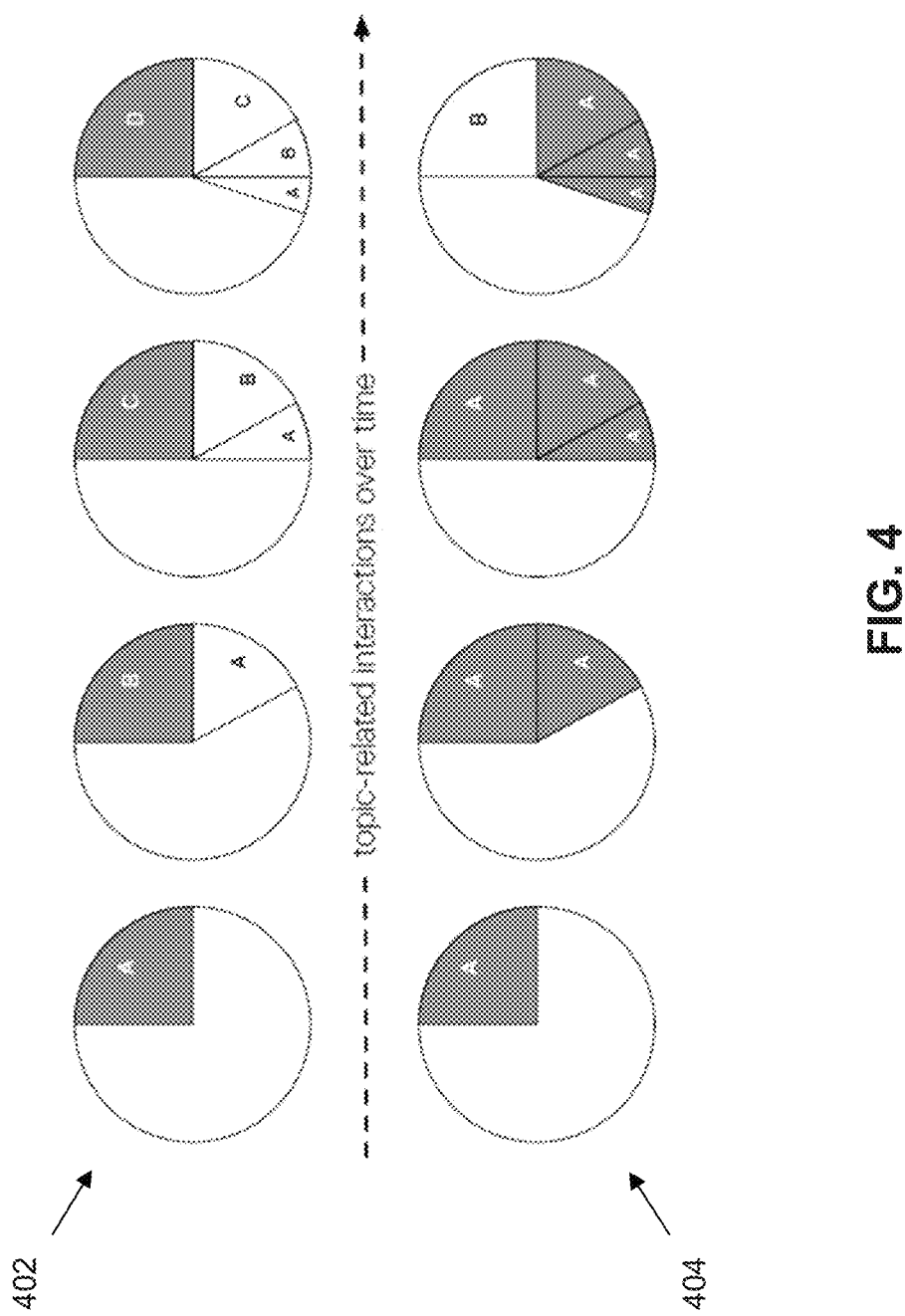
FIG. 4 illustrates an example of how expert scores for users of the system may be affected for a given topic over time, in accordance with one or more implementations of the invention.

For example, FIG. 4 illustrates how expert scores for users of system 100 may be affected for a given topic over time, in accordance with one or more implementations of the invention. Exemplary scenario 402 illustrates how the timing of contributions are considered when determining expert scores. As each new contribution by a new user for a given topic is received, the weight assigned to older contributions is reduced. Exemplary scenario 404 illustrates how multiple contributions by a single user are treated when a new user makes a contribution. User A has made several contributions related to a given topic. A single contribution by User B may be given more weight than any of the prior contributions by User A, but User A's portion of the pie (or expert score) remains larger due to the number of contributions by User A over time.

In various implementations, expertise scoring component 210 may be configured to calculate an updated expert score for a given topic for a user based on feedback received related to that user. In some implementations, question management component 120 may be configured to prompt a user for feedback when a solution to a question posed by that user has been provided by a contributing user. In some implementations, expertise scoring component 210 may be configured to calculate an updated expert score for the topic of the question based on the feedback received in response to that prompt. In some implementations, expertise scoring component 210 may be configured to calculate an updated expert score for a given topic for a user based on feedback received related to that user in real-time. As such, expertise scoring component 210 may be configured to dynamically determine the expertise of system 100 by calculating updating expert scores for users in real-time based on feedback received by the system. In an exemplary implementation, expertise scoring component 210 may be configured to receive an indication of a low rating for a solution provided for a user. For example, a user may receive a 1 out of 5 rating for a solution provided related to a first topic. The low rating for the solution may cause the expert score for the user for the first topic to weaken or decrease.

Language identification component 212 may be configured to identify the language of content provided to and/or accessible by system 100. In various implementations, language identification component 212 may be configured to identify the language (i.e., English, German, French, Italian, and/or other languages) of each interaction by a user with system 100. For example, language identification component 212 may be configured to identify the language of each question, solution, or comment provided by users, non-Q&A data and other data sources as described herein. In various implementations, language identification component 212 may be configured to use one or more natural language processing techniques to identify the language of questions, solutions, or comments provided by users. For example, language identification component 212 may be configured to use one or more natural language processing algorithms to identify the language of questions, solutions, or comments provided by users.

In various implementations, language identification component 212 may be configured to provide an indication of the language of a question, solution, or comment provided by a specific user to profile management component 202 data and other data sources as described herein. Profile management component 202 may be configured to store user profile information indicating the language proficiencies of each user. Based on the language of a question, solution, or comment provided by a specific user to profile management component 202, profile management component 202 may be configured to update the user profile information for that specific user indicating the language proficiencies of that user.

Gamification component 214 may be configured to manage a game based on contributions by users. User involvement in system 100 may be encouraged and/or incentivized by providing a game that tracks user activity, awards points based on user activity, and/or rewards users based on user activity. In various implementations, gamification component 214 may be configured to allocate points to individual users based on particular user activities. For example, the particular user activities that result in points being allocated to a user may include posing a question (i.e., asking a question), providing a solution to a question, rating a solution to a question, receiving a particular rating for a solution provided, reading one or more questions, reading one or more solutions, commenting on one or more questions, commenting on one or more solutions, one or more activities comprising an indication of interest, one or more activities comprising an indication of expertise, an indication that a level of interest has reached one or more predefined levels, an indication that an expert score has reached one or more predefined values, and/or other user activities within system 100. In some implementations, gamification component 214 may be configured to allocate points to an individual user by crediting a game balance of the user. In various implementations, the game information for a user stored in a user profile of the user may comprise a user score level, a number of points (i.e., a game balance), and/or other game information.

In various implementations, gamification component 214 may be configured to allocate points to a user for a given activity based on a point table indicating the number of points to be allocated for each activity. In various implementations, gamification component 214 may be configured to track a user score level of a user that is based on the number of points allocated to the user. For example, a user may level-up from User Score Level 1 to User Score Level 2 when the total number of points allocated to the user reaches 100. In some implementations, gamification component 214 may be configured to cause a notification to be provided to the user when the user is allocated points and/or when the user levels up. For example, the notification may comprise an indication of the points allocated, the reason for the points being allocated, the user score level reached, a reward being provided for being allocated a certain number of points or reaching a new level (i.e., a promotion and/or other reward), and/or other information related to the game information of the user. In some implementations, gamification component 214 may be configured to generate a list of users based on the user score of level of the list of users. In some implementations, gamification component 214 may be configured to cause the list of users based on the user score level of the list of users to be provided to one or more individual users, the list of users, and/or all users of system 100. In some implementations, gamification component 214 may be configured to cause the list of users to be provided periodically (i.e., at predefined intervals, on one or more predefined days each week or month, and/or at the start or end of a predefined period). In some implementations, the list of user may comprise a ranking of the users of system 100 by user score level. The list may comprise all users and/or be bounded to a certain number of users.

The number of users at a given user score level may be unbounded. The number of points required to reach each new user score level may increase at each user score level. For example, the number of points required to reach User Score Level 1 may be 100 points, the number of points required to reach User Score Level 2 may be 150 points, and the number of points required to reach User Score Level 2 may be 200 points. In some implementations, the number of points required to reach each new user score level may increase uniformly and/or exponentially.

Referring back to FIG. 1, user interface component 118 may be configured to generate a user interface and cause the user interface to be displayed to a user. In various implementations, the user interface may be displayed to a user via a display interface of one or more user devices 130. For example, a user interface may be displayed to a user via a graphical user interface of one or more user devices 130. In some implementations, user interface component 118 may be configured to generate a user interface comprising a dashboard in which a user may access information, provide input, and/or otherwise interact with system 100.

In various implementations, the user interface may comprise a webpage, a dashboard, and/or other display that provides a visual representation of a list of questions submitted by users (i.e., questions posed to system 100), solutions to questions provided by users, comments submitted by users related to one or more questions, feedback received for questions or solutions provided to system 100, and/or other information related to one or more questions provided to system 100. In some implementations, the user interface may provide a user with a visual representation of user information. For example, the user information may comprise user profile information, a record of prior interactions by each of the users with system 100 (such as a viewing history, a search history, a record of questions asked, a record of solutions provided, a record of comments provided, feedback received, and/or other prior interactions by each of the users with system 100), and/or other user information. In various implementations, user interface component 118 may be configured to generate a user interface that includes one or more other features as described below with respect to question management component 120.

Question management component 120 may be configured to facilitate provision of an interface that may receive questions from users, request solutions to questions from expert users, and prompt users for feedback regarding solutions provided. In various implementations, question management component 120 may interface with expertise mapping component 116 and user interface component 118 to provide users of system 100 with a webpage, dashboard, and/or other user interface configured to answer questions submitted by users by routing the questions to expert resources able to provide solutions based on a map of the expert resources available to system 100.

In various implementations, question management component 120 may be configured to obtain a question from a user. The question may be received as user input provided by a user. For example, the user input may comprise textual input provided by a user. In various implementations, user interface component 118 may be configured to receive textual input via a search bar or other user input component of a user interface. In some implementations, user interface component 118 may be configured to generate a user interface comprising a user input component configured to receive questions posed by users.

In some implementations, question management component 120 may be configured to autocomplete words and/or questions as textual input is received. For example, question management component 120 may be configured to recognize words or phrases from textual input as it is entered. Based on the recognized words or phrases from the textual input, question management component 120 may be configured to complete at least a portion of the textual input and/or provide a suggestion on how to complete at least a portion of the textual input.

In some implementations, question management component 120 may be configured to identify suggested questions based on textual input provided by a user. For example, as a user provides textual input, question management component 120 may be configured to predict the user's question and/or identify one or more related questions. The suggested questions may comprise predictions of the question to be asked by the user. In some implementations, question management component 120 may be configured to identify suggested questions based on keywords of the textual input provided by the user. In some implementations, question management component 120 may be configured to identify suggested questions based on textual input provided by the user in real-time. In other words, question management component 120 may be configured to identify suggested questions as a user types to reflect the current textual input entered by the user. In some implementations, user interface component 118 may be configured to generate a user interface that provides the suggested questions identified by question management component 120. For example, the suggested questions may be provided in a drop-down list below the textual input component in which the textual input is provided.

In various implementations, question management component 120 may be configured to identify one or more tags to associate with a question and cause the one or more tags to be associated with the question. For example, question management component 120 may be configured to identify one or more tags to associate with a question (i) based on stored tags, (ii) based on tags associated with similar questions, (iii) by extracting tags from the question, and/or (iv) based on user input indicating one or more tags to associate with the question. In some implementations, question management component 120 may be configured to associate a number of tags with a question less than or equal to a predefined maximum number of tags. In an exemplary implementation, no more than ten tags may be associated with each question. In some implementations, question management component 120 may be configured to identify one or more tags to associate with a question and provide the one or more identified tags as recommendations via a user interface generated by user interface component 118. In various implementations, question management component 120 may be configured to cause one or more tags identified for a question (e.g., one or more tags identified based on user input and/or one or more tags automatically identified) to be associated with the question.

In some implementations, question management component 120 may be configured to automatically identify one or more tags to associate with a question based on keywords of the textual input provided by the user. For example, question management component 120 may be configured to automatically identify, from the set of tags stored by system 100, one or more tags to associate with a question based on keywords of the textual input provided by the user. In some implementations, question management component 120 may be configured to automatically identify one or more tags to associate with a question based on keywords of the textual input provided by the user and connections between tags. For example, question management component 120 may be configured to automatically identify the first tag "energy" based on the keyword "energy" appearing in the textual input provided by the user. Question management component 120 may be configured to further identify one or more tags by identifying one or more tags connected to "energy" based on a record of prior questions posed to system 100 and how often "energy" and one or more other tags are associated with a single question. In various implementations, question management component 120 may be configured to automatically identify one or more tags to associate with a question based on keywords of the textual input and connections between individual tags mapped by topic mapping component 208. For example, and referring to the foregoing example, question management component 120 may be configured to automatically identify a first tag and/or a second tag to associate with a question in addition to the tag "energy" based on the connections mapped between "energy," the first tag, and the second tag by topic mapping component 208. Question management component 120 may be configured to identify the first tag and the second tag based on a determination that the connection between the first tag and "energy" and the connection between the second tag and "energy" are the highest score connections with the tag "energy." In various implementations, question management component 120 may be configured to associate automatically identified tags with the question.

In some implementations, question management component 120 may be configured to identify one or more tags to associate with a question based on tags associated with similar questions. For example, question management component 120 may be configured to identify one or more tags to associate with a question based on tags associated with similar questions that have been identified by question management component 120 using reflexive random indexing and/or one or more other computational techniques (e.g., other word embedding techniques and/or other sentence embedding techniques), including other techniques described herein and/or as otherwise known. In some implementations, question management component 120 may be configured to identify one or more tags to associate with a question based only on similar questions that are within a predefined threshold degree of similarity to the questions (e.g., based on a predefined number of matching keywords or based on a predefined threshold similarity score) and/or are within a top number of similar questions. For example, question management component 120 may be configured to identify one or more tags to associate with a question based only on the top 5 similar questions identified.

In some implementations, question management component 120 may be configured to identify one or more tags to associate with a question by automatically extracting tags from the question. For example, question management component 120 may be configured to identify one or more tags that are not stored in a set of stored tags by system 100 to associate with a question based on keywords of the textual input provided by the user. By extracting keywords from a question provided by a user and associating the keywords with the question as new tags, system 100 may be able to associate tags with questions without necessarily preloading a set of stored tags when developing a cognitive engine for a new organization or set of users.

In some implementations, question management component 120 may be configured to identify one or more tags to associate with a question based on user input indicating one or more tags to associate with the question. For example, a user may search for one or more tags via a search bar of the user interface generated by user interface component 118 and/or select one or more recommended tags identified by question management component 120 and provided via the user interface generated by user interface component 118. In some implementations, user input indicating one or more tags to associate with the question may comprise textual input. The textual input may identify one or more tags not stored or indexed by the system (e.g., one or more new tags that relate to new topics or new ways of referring to an existing topic).

In some implementations, question management component 120 may be configured to determine that the tags stored (i.e., the tags stored in knowledge database 122 and/or otherwise known by system 100) do not include a new tag extracted from a question and/or obtained via user input. In other words, question management component 122 may be configured to determine whether the new tag is similar to at least one tag of the tags stored. For example, question management component 122 may be configured to determine whether the new tag is within a threshold degree of similarity to at least one tag of the tags stored. Based on a determination that a tag extracted from a question and/or obtained via user input is a new tag, question management component 120 may be configured to cause an indication of the new tag identified to be provided to topic mapping component 208. In some implementations, question management component 120 may be configured to cause an indication of a new tag identified to be provided to topic mapping component 208 only if the question associated with the new tag is published, if the question is provided to one or more expert users, if an answer or solution to the question is provided and/or if one or more other criteria is met.

In some implementations, question management component 120 may be configured to identify and provide an indication of one or more questions previously posed to system 100 that are similar to a question currently entered. In some implementations, question management component 120 may be configured to identify one or more questions by searching a record of prior questions posted to system 100 for one or more questions previously posed with one or more matching keywords. In some implementations, question management component 120 may be configured to identify and provide all questions previously posed to system 100 that have a predefined minimum percentage of matching keywords and/or a predefined minimum number of matching keywords.

In some implementations, question management component 120 may be configured to identify one or more questions previously posed to system 100 that are similar to a question currently entered using reflexive random indexing and/or one or more other computational techniques. The one or more other computational techniques may include one or more computational techniques now known or future developed. Reflexive random indexing generates similarity from co-occurrence and from shared occurrence with other items. For example, question management component 120 may be configured to compute a vector in a multidimensional space corresponding to each question based on the words and expressions used in the question and its solutions. Questions about related topics end up having vectors that lie close to each other (cosine similarity). When a user enters a new question, question management component 120 may be configured to compute a vector corresponding to the user's textual input. Question management component 120 may be configured to identify one or more questions previously posed to system 100 that are similar to a question currently entered by identifying previously posed questions that have similar vectors to the question currently entered.

Figure 5:
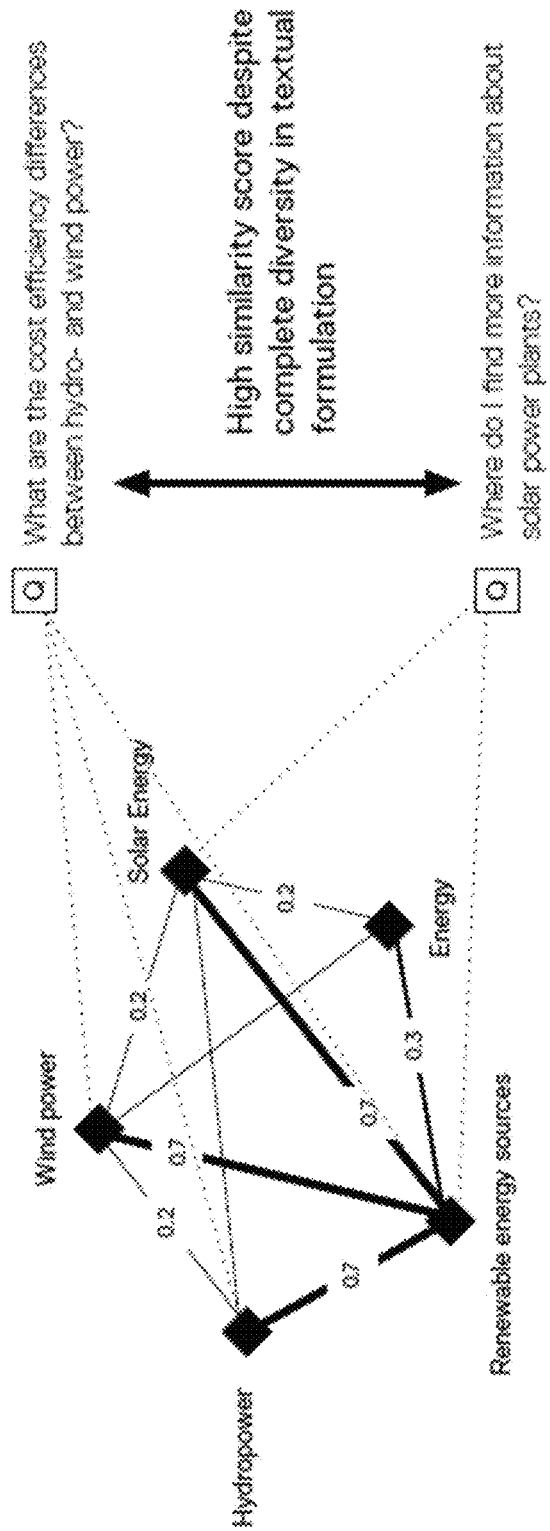
FIG. 5 illustrates an example of how similar questions may be identified despite diversity in textual formation between the questions, in accordance with one or more implementations of the invention.

FIG. 5 illustrates how similar questions may be identified despite diversity in textual formation between the questions, in accordance with one or more implementations of the invention. The question "What are the cost efficiency differences between hydro- and wind-power?" may relate to the tags "wind power," "hydro power," and "renewable energy sources." The question "Where do I find more information about solar power plants?" may relate to the tags "solar energy" and "renewable energy sources." Despite the fact that the two questions only have one tag in common, question management component 120 may be configured to determine the two questions have a high degree of similarity due to the connections between the tags of the individual questions and the connections between the tags of the individual questions and similar tags.

In some implementations, question management component 120 may be configured to identify and provide at least a predefined number of similar questions for each question submitted. For example, question management component 120 may be configured to score and/or rank all similar questions identified and provide at least the predefined number of similar questions based on the score and/or rank of the identified similar questions. In some implementations, question management component 120 may be configured to identify one or more tags to associate with a question based on tags associated with similar questions posed to system 100.

In various implementations, question management component 120 may be configured to identify a user to whom to route a question, based on the one or more tags associated with the question. In some instances, a question posed to system 100 may relate to a single topic. As such, the question may be associated with a single tag and the user to route the question to may be identified simply by identifying the user with the highest expert score for that topic. However, questions posed to the system frequently relate to multiple topics, and are thus frequently associated with multiple tags. In various implementations, question management component 120 may be configured to identify a user to route a question by predicting the one or more users of system 100 that are most likely to provide a correct and fast solution to the question. To do so, question management component 120 may be configured to identify the user whose expertise best matches the particular combination of tags associated with a question.

In various implementations, question management component 120 may be configured to identify the user whose expertise best matches the particular combination of tags associated with a question by calculating a score for the combination of tags for each user. To calculate a score for the combination of tags for each user, question management component 120 may be configured to weight a user's expert scores for relevant tags differently. In some implementations, question management component 120 may be configured to weight expert scores for more specific tags (e.g., "Outlook") greater than expert scores for broader tags (e.g., email). In some implementations, question management component 120 may be configured to include expert scores for tags not included in the combination of tags in the calculation of a score for the combination of tags for the question. For example, question management component 120 may be configured to include expert scores for tags that are closely related, per the connections between tags mapped by topic mapping component 208, but weight the tags in the combination of tags greater than the tags not included in the combination of tags.

Figure 6:
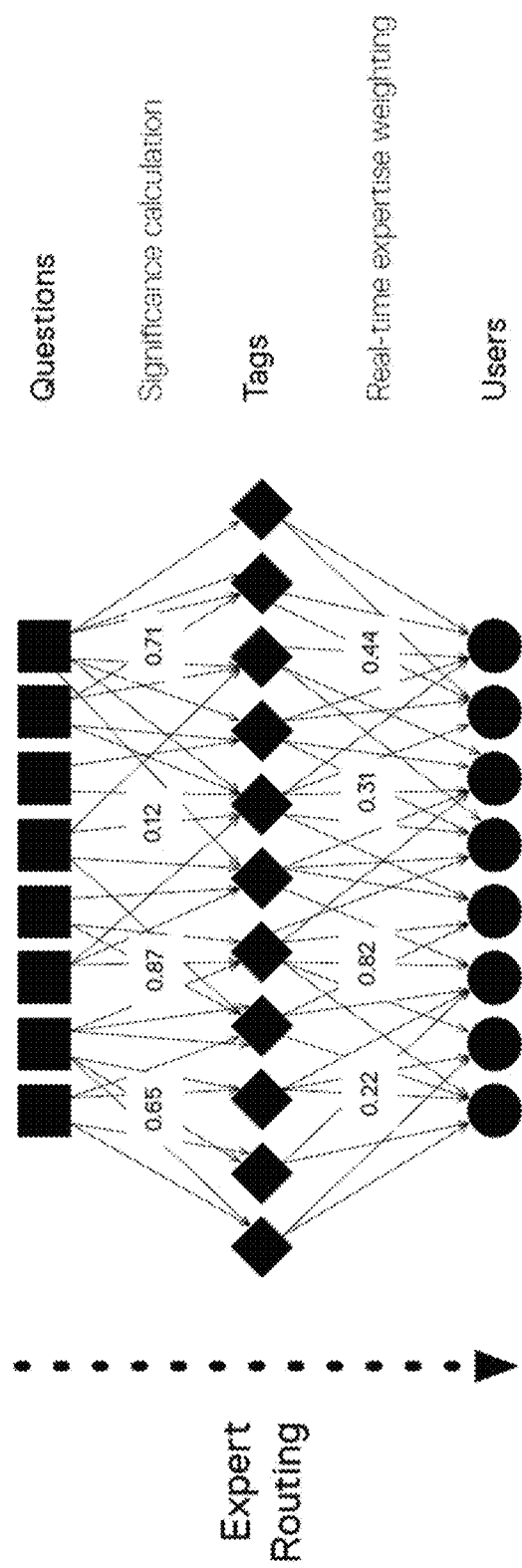
FIG. 6 illustrates an example of the connections that may be determined to identify the best user to route a question, in accordance with one or more implementations of the invention.

For example, FIG. 6 illustrates the connections that may be determined to identify the best user to route a question to, in accordance with one or more implementations of the invention. When each question is received, question management component 120 may be configured to identify one or more tags to associate with each question based on keywords of the textual input provided by the user. For example, question management component 120 may be configured to calculate the significance of each tag to each question submitted. Calculating the significant of each tag to a question may comprise determining a weight to apply to each tag based on the tags of the combination of tags associated with the question, connections between the tags in the combination of tags associated with the question, connections between the tags in the combination of tags associated with the question and one or more other tags, tags of similar questions identified, and/or other information mapped by system 100. For example, question management component 120 may be configured to calculate the significance of each tag to each question submitted based on the mapped connections by topic mapping component 208. Based on the weights assigned to each tag, question management component 120 may be configured to identify a user best suited to answer the question by weighting the corresponding expert scores for each user related to each tag according to the weight assigned to each tag. The highest scoring user may be identified as an expert user to route the question.

In some implementations, question management component 120 may be configured to identify a user from a set of users to route a question based on the workload of each user. Repeatedly routing questions to the same user may result in a user receiving too many questions to answer. Moreover, repeatedly routing questions for a given topic to the same user may prevent other users from demonstrating expertise in that topic. By analyzing the activity of different users by time and day of the week, the system can alert those experts for a new question who are likely to be available to provide a solution without delay. In doing so, the systems and methods described herein may make sure that the highest scoring experts are not demotivated by receiving too many questions. In some implementations, question management component 120 may be configured to dynamically allocate questions to identified users based on the workload of each user. For example, question management component 120 may be configured to determine a workload of each user by determining a number of questions routed to each user, a number of questions routed to each user during a limited time period (e.g., during the last week), a number of questions routed to each user that have not been answered (i.e., a number of unanswered questions), a number of solutions provided by each user, a number of solutions provided by each user during a limited time period (e.g., during the last month), and/or other indications of the workload for each user. In some implementations, question management component 120 may be configured to cause a question to be provided to an identified user of a set of users based on the workload of one or more of the set of users. For example, question management component 120 may be configured to cause a question to be provided to a first user with a lower expert score for the question than a second user with a higher expert score for the question based on a determination that the second user has a greater number of unanswered questions than the first user.

In some implementations, question management component 120 may be configured to identify a user from a set of users to whom to route a question, based on the language proficiencies of each of the set of users. In some implementations, question management component 120 may be configured to determine that a question is in a first language and cause the question to be routed to a first user with a lower expert score for the question than a second user with a higher expert score for the question based on a determination that the second user is not proficient in the first language but the first user is. In some implementations, question management component 120 may be configured to cause a question to be routed to an identified user based on the language proficiencies of the identified user. For example, question management component 120 may be configured to determine that a question is in a first language and cause the question to be translated from a second language to the first language based on a determination that the second user is not proficient in the first language but is proficient in the second language.

In various implementations, question management component 120 may be configured to identify multiple users as expert users to route a question to based on one or more of the foregoing techniques. For example, combing all of the foregoing factors (i.e., the set of tags, the expert scores for each user, the workload of each user, the language proficiencies of each user, and/or other information), question management component 120 may be configured to obtain an ordered list of users identified as expert users to route the question to. The ordered list of users may represent the top experts (i.e., the users with the highest expert score) for a given question at a given time.

In various implementations, question management component 120 may be configured to cause the question to be provided to the one or more users identified as expert users. For example, question management component 120 may be configured to cause a message to be transmitted to the identified user that includes the question. In some implementations, question management component 120 may be configured to cause a notification to be provided to the identified user via the user interface generated by user interface component 118. In some implementations, question management component 120 may be configured to cause an email to be transmitted to the identified user that includes the question. In some implementations, question management component 120 may be configured to cause a notification to be provided to the identified user via the user interface generated by user interface component 118. For example, the user interface may include a display component that indicates when a user has one or more unread notifications or unresolved questions.

In various implementations, question management component 120 may be configured to cause the question to be provided to a predefined number of users identified as expert users. For example, question management component 120 may be configured to cause the question to be provided to a certain number of users appearing at the top of the ordered list of users. In an exemplary implementation, the predefined number of users to which a question is to be routed to may comprise four to ten experts to maximize the likelihood of getting a quality solution or answer to the question as soon as possible.

In various implementations, the users identified as expert users may not be broadcasted or known by other users— even to the user that asked the question. In other words, there is no broadcasting. Users may only be notified about questions for which they are identified as an expert user to route the question to (i.e., questions for which the user is identified as a top expert). This limits the number of notifications that every user receives, and keeps the experts motivated to contribute their knowledge when it is really needed.

In various implementations, question management component 120 may be configured to cause questions to be provided to users identified as an expert user based on communication preferences for each user. To achieve optimal results, users may be notified of questions, solutions, and/or comments through user-defined communication channels. That is, in some implementations, users may only receive notifications through communication channels of their choice. The communication preferences may be obtained from a user profile for each user. For example, user profile information for a user may include communication preferences for the user (i.e., preferred means of communication for each user).

In various implementations, question management component 120 may be configured to obtain a solution to a question from a user. In some implementations, question management component 120 may be configured to receive the solution from the user. For example, the user may provide the solution with user device 130 via a user interface generated by user interface component 118. For example, user interface component 118 may be configured to generate a user interface comprising a textual input component that appears when a user wishes to provide a solution. The user interface may comprise a selectable icon that enables a user to indicate the user wishes to provide a solution. In various implementations, question management component 120 may be configured to cause the solution to be posted to a user interface and appear in association with the corresponding question. In some implementations, question management component 120 may be configured to cause the user that asked a question to be notified via a user interface generated by user interface component 118 that a solution to the question has been provided. For example, the user that asked the question may receive an alert via a user interface indicating the question has been answered. In various implementations, question management component 120 may be configured to cause the solution obtained to be provided to expertise mapping component 116 and/or stored in knowledge database 122.

In various implementations, question management component 120 may be configured to prompt the user that asked a question for feedback related to the solution provided. For example, management component 120 may be configured to prompt the user that asked a question for feedback related to the solution provided by providing a selectable component via a user interface generated by user interface component 118 configured to receive feedback related to the solution. The selectable icon may appear in association with the question and/or solution on the user interface. In some implementations, the feedback provided may comprise textual input detailing the user that asked the question's opinion of the solution. In some implementations, the feedback provided by comprise numerical input indicating the quality of the solution out of a predefined number. For example, a user may give a solution a number of stars out of 5, a score from 1-10, and/or other numerical feedback. In various implementations, question management component 120 may be configured to prompt the user that asked a question for feedback related to the solution provided when the solution is provided. The prompt may comprise an alert, notification, message, e-mail, and/or other prompt for feedback.

In various implementations, question management component 120 may be configured to cause the feedback received to be provided to expertise mapping component 116 and/or stored in knowledge database 122. In some implementations, feedback received may be used by topic mapping component 208 to map relationships between topics, subtopics, and/or tags. In some implementations, feedback received may be used by expertise scoring component 210 to calculate an expert score for each topic for each user.

In various implementations, question management component 120 may be configured to use the feedback received to monitor the accuracy of system 100. For example, system 100 may be associated with an accuracy algorithm. The accuracy algorithm may be updated and monitored by expertise mapping component 116. For example, topic mapping component 208 and expertise scoring component 210 may utilize the accuracy algorithm to map relationships between topics, subtopics, and/or tags and update expert scores for users, respectively. The accuracy algorithm may be tied to the machine learning and dynamic allocation of experts. The accuracy algorithm may measure the performance of system 100 using one or more different metrics. For example, a key indicator may comprise the accuracy of the expert routing. This is the percentage of questions that are solved by one of the experts who were identified by the expert search algorithm. The quality of solutions can be measured by feedback related to the corresponding solution.

Knowledge database 122 may be configured to store information related to a plurality of users. For example, knowledge database 122 may be configured to store information related to a plurality of users with access to system 100. The plurality of users with access to system 100 may comprise a set of users. In some implementations, the users of system 100 may comprise individual members of an organization or predefined group of users. For example, in various implementations, knowledge database 122 may be configured to store user profile information, a record of prior interactions by each of the users with system 100 (such as a viewing history, a search history, a record of questions asked, a record of solutions provided, a record of comments provided, feedback received, and/or other prior interactions by each of the users with system 100), a set of tags that each correspond to at least one topic, connections between topics, sub-topics, and/or tags, and/or other information used by the system of map and identify expert resources. System 100 may facilitate access to knowledge database 122 by each of the one or more components of system 100.

User device(s) 130 (also interchangeably referred to herein as user device 140, user devices 140, or one or more user devices 140 for convenience) may be used by users of system 100 to interface with system 100. In some instances, user device(s) 130 may be programmed to enable a user to access a user interface generated by user interface component 118, provide textual input related to one or more questions submitted to system 100 (e.g., provide a question, provide a solution to a question, comment on a question, and/or provide feedback related to a question), and/or otherwise interact with system 100. In some implementations, although not illustrated, user device(s) 130 may be programmed with some or all of computer readable instructions 114 to perform some or all of the functions of computer readable instructions 114 locally at user device(s) 130.

User device(s) 130 may be configured as a server device (e.g., having one or more server blades, processors, etc.), a gaming console, a handheld gaming device, a personal computer (e.g., a desktop computer, a laptop computer, etc.), a smartphone, a tablet computing device, an Internet of Things (IoT) device, a wearable device, and/or other device that can be programmed to interface with computer system 110.

Exemplary Flowcharts of Processes

Figure 7:
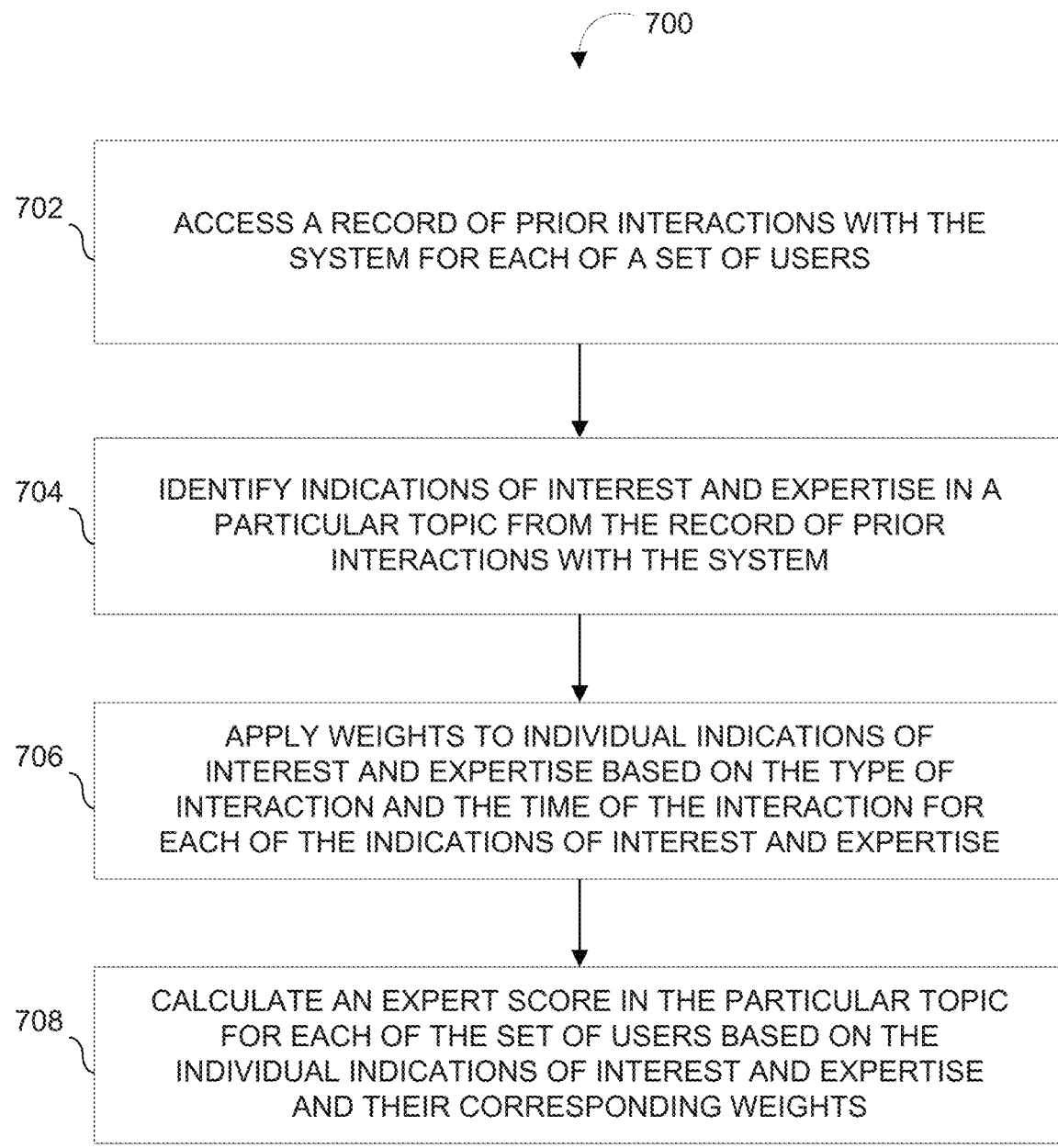
FIG. 7 illustrates an example of a process of mapping expert resources within an organization or group of users, in accordance with one or more implementations.

FIG. 7 illustrates a process 700 of mapping expert resources within an organization or group of users, in accordance with one or more implementations. The operations of process 700 presented below are intended to be illustrative and, as such, should not be viewed as limiting. In some implementations, process 700 may be accomplished with one or more additional operations not described, and/or without one or more of the operations discussed. In some implementations, two or more of the operations may occur substantially simultaneously. The described operations may be accomplished using some or all of the system components described in detail above.

In some implementations, process 700 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of process 700 in response to instructions stored electronically on one or more electronic storage mediums. The one or more processing devices may include one or more devices configured through hardware, firmware, and/or software to be specifically designed for execution of one or more of the operations of process 700.

In an operation 702, process 700 may include accessing a record of prior interactions with system for each of a set of users. For example, the record of prior interactions by each of the users may be stored in a knowledge database (e.g., knowledge database 122). In some implementations, operation 702 may be performed by a processor component the same as or similar to interest identification component 204 and expertise identification component 206 (shown in FIG. 2 and described herein).

In an operation 704, process 700 may include identifying indications of interest and expertise in one or more topics from the record of prior interactions with the system. An indication of interest in a topic may comprise one or more views of prior questions received by the system related to the topic, one or more searches related to the topic, and/or one or more other prior interactions of a user indicating an interest in a topic. An indication of expertise in a topic may comprise contributions related to that topic (e.g., questions, solutions, or comments related to that topic and non-Q&A data), feedback from other users of the content the user contributed related to that topic, and/or one or more other prior interactions of a user indicating an expertise in a topic. As such, indications of interest and expertise in a given topic may be identified from the viewing history for each user indicating one or more views of prior questions, solutions, and/or comments related to the topic, the search history indicating one or more searches related to the topic, the record of contributions for each user (such as questions, solutions to questions, or comments related to questions or solutions the user has provided related to that topic), and/or a record of feedback the user receives for their contributions. In various implementations, indications of interest and expertise in a topic may be identified by identifying one or more tags (or keywords) associated with the topic within the record of prior interactions with the system. In some implementations, operation 704 may be performed by a processor component the same as or similar to interest identification component 204 and expertise identification component 206 (shown in FIG. 2 and described herein).

In an operation 706, process 700 may include applying weights to individual indications of interest and expertise based on the type of interaction and the time of the interaction for each of the indications of interest and expertise. For example, indications of expertise in a given topic may be weighted more heavily than indications of interest in that topic when calculating an expert score for that topic. The weights may represent a multi-factor test for calculating expert scores. In some implementations, operation 706 may be performed by a processor component the same as or similar to expertise scoring component 210 (shown in FIG. 2 and described herein).

In an operation 708, process 700 may include calculating an expert score in one or more topics for each of the set of users based on the individual indications of interest and expertise and the corresponding weights assigned to each of the individual indications of interest and expertise. In some implementations, calculating a user's expert score for a given topic may factor in the indications of interest and expertise identified for that topic, the types of indications of interest identified, the types of indications of expertise identified, the date and/or time associated with the indications of interest or expertise, the expert score of other users for that topic, and/or the user's expert score for other topics, among other factors. In some implementations, operation 708 may be performed by a processor component the same as or similar to expertise scoring component 210 (shown in FIG. 2 and described herein).

Figure 8:
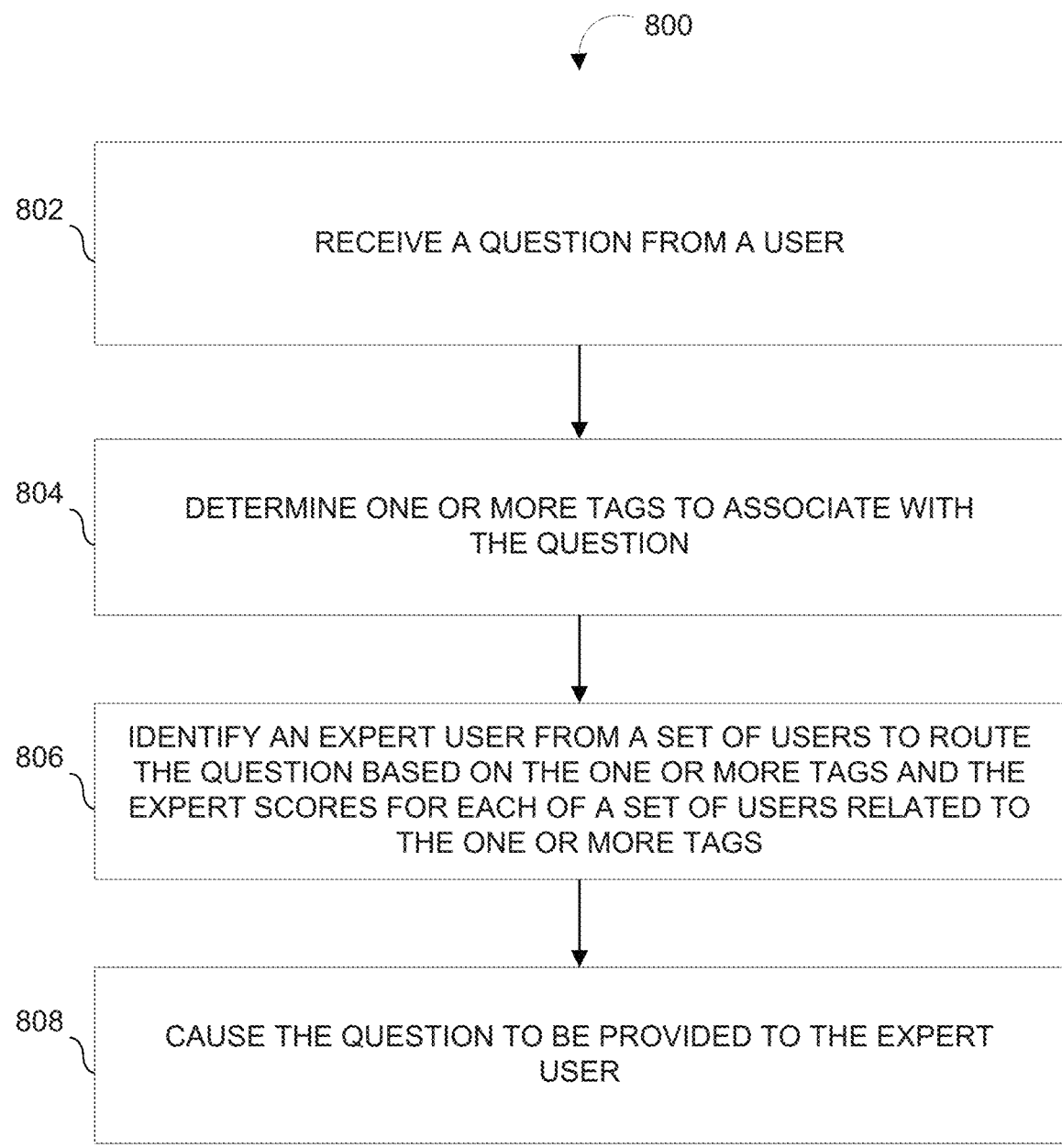
FIG. 8 illustrates an example of a process of identifying expert resources to route questions based on the mapped expert resources, in accordance with one or more implementations.

FIG. 8 illustrates a process 800 of identifying expert resources to route questions based on mapped expert resources, in accordance with one or more implementations. The operations of process 800 presented below are intended to be illustrative and, as such, should not be viewed as limiting. In some implementations, process 800 may be accomplished with one or more additional operations not described, and/or without one or more of the operations discussed. In some implementations, two or more of the operations may occur substantially simultaneously. The described operations may be accomplished using some or all of the system components described in detail above.

In some implementations, process 800 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of process 800 in response to instructions stored electronically on one or more electronic storage mediums. The one or more processing devices may include one or more devices configured through hardware, firmware, and/or software to be specifically designed for execution of one or more of the operations of process 800.

In an operation 802, process 800 may include receiving a question from a user. The question may be received as user input provided by a user. For example, the user input may comprise textual input provided by a user. Textual input may be received via a search bar or other user input component of a user interface. In various implementations, suggested questions, words, or tags may be provided as textual input is provided. In other words, dynamic suggestions related to the textual input or question may be provided in real-time. In some implementations, operation 802 may be performed by a processor component the same as or similar to user interface component 118 and question management component 120 (shown in FIG. 1 and described herein).

In an operation 804, process 800 may include determining one or more tags to associate with the question. The number of tags associated with a question may be limited by a maximum number of tags (e.g., no more than 10 tags per question). Tags to associate with the question may be automatically determined by the system or determined based on user input indicating one or more tags to associate with the question. In some implementations, the one or more tags to associate with the question may be identified from a set of stored tags. In some implementations, one or more tags to associate with a question may be provided as recommendations via the user interface in association with the textual input provided by the user. In some implementations, one or more tags to associate with a question may be automatically identified based on keywords of the textual input provided by the user and connections between one or more tags. In some implementations, operation 804 may be performed by a processor component the same as or similar to question management component 120 (shown in FIG. 1 and described herein).

In an operation 806, process 800 may include identifying an expert user from a set of users to route the question based on the one or more tags and the expert scores for each of a set of users related to the one or more tags. To do so, a user may be identified whose expertise best matches the particular combination of tags associated with the question. In some implementations, the user identified as the expert user to route the question may be identified from a set of users based on the workload of each of the set of users. In some implementations, the user identified as the expert user to route the question to may be identified from a set of users based on the language proficiencies of each of the set of users. In some implementations, operation 806 may be performed by a processor component the same as or similar to question management component 120 (shown in FIG. 1 and described herein).

In an operation 808, process 800 may include causing the question to be provided to the expert user. In some implementations, operation 808 may be performed by a processor component the same as or similar to question management component 120 (shown in FIG. 1 and described herein).

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in electronic storage, which may comprise random access memory (RAM), read only memory (ROM), and/or other memory. In some implementations, the various instructions described herein may be stored in electronic storage of one or more components of system 100 and/or accessible via a network (e.g., via the Internet, cloud storage, and/or one or more other networks). The electronic storage may store the computer program instructions (e.g., the aforementioned instructions) to be executed by processor(s) 112 as well as data that may be manipulated by processor(s) 112. The electronic storage may comprise floppy disks, hard disks, optical disks, tapes, or other storage media for storing computer-executable instructions and/or data.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although illustrated in FIG. 1 as a single component, computer system 110 and user device(s) 130 may each include a plurality of individual components (e.g., computer devices) each programmed with at least some of the functions described herein. In this manner, some components of computer system 110 and/or associated user devices may perform some functions while other components may perform other functions, as would be appreciated. Furthermore, it should be appreciated that although the various instructions are illustrated in FIG. 1 as being co-located within a single processing unit, in implementations in which processor(s) 112 include multiple processing units, one or more instructions may be executed remotely from the other instructions.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The one or more databases 104 described herein may be, include, or interface to, for example, an Oracle™ relational database sold commercially by Oracle Corporation. Other databases, such as Informix™, DB2 (Database 2) or other data storage, including file-based, or question formats, platforms, or resources such as OLAP (On Line Analytical Processing), SQL (Structured Question Language), a SAN (storage area network), Microsoft Access™ or others may also be used, incorporated, or accessed. The one or more databases 104 can include any known suitable database and may comprise one or more such databases that reside in one or more physical devices and in one or more physical locations. The one or more databases 104 may store a plurality of types of data and/or files and associated data or file descriptions, administrative information, or any other data.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to tag text in a document for use in a knowledge and/or skills management technology platform, the system comprising:
   a computer system comprising one or more physical processors programmed with computer program instructions that, when executed by the one or more physical processors, program the computer system to:

execute, on a text segment of the text in the document, a tagging algorithm to generate one or more tag suggestions indicative of a relevant topic associated with the text segment, the tagging algorithm comprising a key phrase extraction component and a key phrase generation component, wherein executing the tagging algorithm comprises:

extracting, by the key phrase extraction component, a first set of key phrase candidates in the text segment based at least in part on first relevance criteria;

scoring, by the key phrase extraction component, one or more extracted key phrase candidates in the first set of key phrase candidates based at least in part on scoring criteria, the scoring criteria including at least one of:
  (i) a frequency of occurrence of the extracted key phrase candidate in the text segment,
  (ii) a position of the extracted key phrase candidate in the text segment,
  (iii) a determination that the extracted key phrase candidate appears in an online encyclopedic database,
  (iv) a commonality of the extracted key phrase candidate in a network associated with the knowledge and/or skills management technology platform, or
  (v) a lack of commonality of the extracted key phrase candidate in a language of the text segment;

generating, by the key phrase generation component, a second set of one or more key phrase candidates based at least in part on second relevance criteria, wherein the second set of one or more key phrase candidates do not appear in the text segment; and generating the one or more tag suggestions based at least in part on at least one of: i) at least one highest scoring extracted key phrase candidate in the first set of key phrase candidates or ii) at least one generated key phrase candidate in the second one or more key phrase candidates; and apply a machine learning algorithm to create and store a knowledge and/or skills map that links a user to the topic indicated by the one or more tag suggestions and that indicates a user score for the user in relation to the topic.

2. The system of claim 1, wherein extracting the first set of key phrase candidates comprises:
splitting the text segment into one or more sentences;
obtaining a respective set of one or more tokens for each sentence; and
applying a respective part-of-speech tag to each token, wherein each part-of-speech tag identifies a grammatical role of a respective one or more words in a corresponding sentence.

3. The system of claim 1, wherein executing the tagging algorithm further comprises:
filtering the first set of key phrase candidates based at least in part on filtering criteria to obtain a filtered set of key phrase candidates, wherein scoring the one or more extracted key phrase candidates comprises scoring the filtered set of key phrase candidates; and
selecting one or more of the scored key phrase candidates determined to be most relevant to the topic.

4. The system of claim 1, wherein generating, by the key phrase generation component, the second set of key phrase candidates comprises:

deriving a set of suggested hypernyms from a database of potential hyponym-hypernym pairs;

identifying a set of hypernym candidates from the set of suggested hypernyms, the identifying comprising identifying each suggested hypernym for which there are at least two associated hyponyms among the first set of key phrase candidates;

including the set of hypernym candidates in the second set of key phrase candidates; and selecting one or more hypernym candidates from the set of hypernym candidates for inclusion among the one or more tag suggestions based at least in part on the second relevance criteria.

5. The system of claim 4, wherein the second relevance criteria comprises at least one of: a total input key phrase coverage; a total number of occurrences of the at least two associated hyponyms in a language of the text segment; or a total number of page views of an online encyclopedia page corresponding to the suggested hypernym, and wherein selecting the one or more hypernym candidates for inclusion among the one or more tag suggestions comprises:
sorting the set of hypernym candidates sequentially based at least in part on the second relevance criteria; and
iterating through the sorted set of hypernym candidates to select, for inclusion among the one or more tag suggestions, each hypernym candidate that covers at least one hyponym not covered by any previous hypernym candidate in the sorted set of hypernym candidates.

6. The system of claim 4, wherein identifying the set of hypernym candidates further comprises identifying one or more user-context hypernyms based at least in part on one or more top-linked tags corresponding to a user.

7. A method for tagging text in a document for use in a knowledge and/or skills management technology platform, the method comprising:
programming a computer system comprising one or more physical processors with computer program instructions that, when executed by the one or more physical processors, program the computer system to perform the steps of:
executing, on a text segment of the text in the document, a tagging algorithm to generate one or more tag suggestions indicative of a relevant topic associated with the text segment, the tagging algorithm comprising a key phrase extraction component and a key phrase generation component, wherein executing the tagging algorithm comprises:

extracting, by the key phrase extraction component, a first set of key phrase candidates in the text segment based at least in part on first relevance criteria;

scoring, by the key phrase extraction component, one or more extracted key phrase candidates in the first set of key phrase candidates based at least in part on scoring criteria, the scoring criteria including at least one of:
  (i) a frequency of occurrence of the extracted key phrase candidate in the text segment,
  (ii) a position of the extracted key phrase candidate in the text segment,
  (iii) a determination that the extracted key phrase candidate appears in an online encyclopedic database,
  (iv) a commonality of the extracted key phrase candidate in a network associated with the knowledge and/or skills management technology platform, or (v) a lack of commonality of the extracted key phrase candidate in a language of the text segment;

generating, by the key phrase generation component, a second set of one or more key phrase candidates based at least in part on second relevance criteria, wherein the second set of one or more key phrase candidates do not appear in the text segment; and generating the one or more tag suggestions based at least in part on at least one of: i) at least one highest scoring extracted key phrase candidate in the first set of key phrase candidates or ii) at least one generated key phrase candidate in the second one or more key phrase candidates; and applying a machine learning algorithm to create and store a knowledge and/or skills map that links a user to the topic indicated by the one or more tag suggestions and that indicates a user score for the user in relation to the topic.

8. The method of claim 7, wherein extracting the first set of key phrase candidates comprises:

splitting the text segment into one or more sentences;

obtaining a respective set of one or more tokens for each sentence; and applying a respective part-of-speech tag to each token, wherein each part-of-speech tag identifies a grammatical role of a respective one or more words in a corresponding sentence.

9. The method of claim 7, wherein executing the tagging algorithm further comprises:

filtering the first set of key phrase candidates based at least in part on filtering criteria to obtain a filtered set of key phrase candidates, wherein scoring the one or more extracted key phrase candidates comprises scoring the filtered set of key phrase candidates; and selecting one or more of the scored key phrase candidates determined to be most relevant to the topic.

10. The method of claim 7, wherein generating, by the key phrase generation component, the second set of key phrase candidates comprises:

deriving a set of suggested hypernyms from a database of potential hyponym-hypernym pairs;

identifying a set of hypernym candidates from the set of suggested hypernyms, the identifying comprising identifying each suggested hypernym for which there are at least two associated hyponyms among the first set of key phrase candidates;

including the set of hypernym candidates in the second set of key phrase candidates; and selecting one or more hypernym candidates from the set of hypernym candidates for inclusion among the one or more tag suggestions based at least in part on the second relevance criteria.

11. The method of claim 10, wherein the second relevance criteria comprises at least one of: a total input key phrase coverage; a total number of occurrences of the at least two associated hyponyms in a language of the text segment; or a total number of page views of an online encyclopedia page corresponding to the suggested hypernym, and wherein selecting the one or more hypernym candidates for inclusion among the one or more tag suggestions comprises:

sorting the set of hypernym candidates sequentially based at least in part on the second relevance criteria; and iterating through the sorted set of hypernym candidates to select, for inclusion among the one or more tag suggestions, each hypernym candidate that covers at least one hyponym not covered by any previous hypernym candidate in the sorted set of hypernym candidates.

12. The method of claim 10, wherein identifying the set of hypernym candidates further comprises identifying one or more user-context hypernyms based at least in part on one or more top-linked tags corresponding to a user.

13. A system configured to tag text in a document for use in a knowledge and/or skills management technology platform, the system comprising:

a computer system comprising one or more physical processors programmed with computer program instructions that, when executed by the one or more physical processors, program the computer system to:

execute, on a text segment of the text in the document, a tagging algorithm to generate one or more tag suggestions indicative of a relevant topic associated with the text segment, the tagging algorithm comprising a key phrase extraction component and a key phrase generation component, wherein executing the tagging algorithm comprises:

extracting, by the key phrase extraction component, a first set of one or more key phrase candidates in the text segment based at least in part on first relevance criteria;

generating, by the key phrase generation component, a second set of one or more key phrase candidates based at least in part on second relevance criteria, wherein the second set of one or more key phrase candidates do not appear in the text segment, and wherein generating, by the key phrase generation component, the second set of key phrase candidates comprises:

deriving a set of suggested hypernyms from a database of potential hyponym-hypernym pairs;

identifying a set of hypernym candidates from the set of suggested hypernyms, the identifying comprising identifying each suggested hypernym for which there are at least two associated hyponyms among the first set of key phrase candidates;

including the set of hypernym candidates in the second set of key phrase candidates; and selecting one or more hypernym candidates from the set of hypernym candidates for inclusion among the one or more tag suggestions based at least in part on the second relevance criteria; and apply a machine learning algorithm to create and store a knowledge and/or skills map that links a user to the topic indicated by the one or more tag suggestions and that indicates a user score for the user in relation to the topic.

14. The system of claim 13, wherein extracting the first set of key phrase candidates comprises splitting the text segment into one or more sentences;

obtaining a respective set of one or more tokens for each sentence; and applying a respective part-of-speech tag to each token, wherein each part-of-speech tag identifies a grammatical role of a respective one or more words in a corresponding sentence.

15. The system of claim 13, wherein executing the tagging algorithm further comprises:

filtering the first set of key phrase candidates based at least in part on filtering criteria to obtain a filtered set of key phrase candidates, wherein scoring the one or more extracted key phrase candidates comprises scoring the filtered set of key phrase candidates; and selecting one or more of the scored key phrase candidates determined to be most relevant to the topic.

16. The system of claim 13, wherein the second relevance criteria comprises at least one of: a total input key phrase coverage; a total number of occurrences of the at least two associated hyponyms in a language of the text segment; or a total number of page views of an online encyclopedia page corresponding to the suggested hypernym, and wherein selecting the one or more hypernym candidates for inclusion among the one or more tag suggestions comprises:

sorting the set of hypernym candidates sequentially based at least in part on the second relevance criteria; and iterating through the sorted set of hypernym candidates to select, for inclusion among the one or more tag suggestions, each hypernym candidate that covers at least one hyponym not covered by any previous hypernym candidate in the sorted set of hypernym candidates.

17. The system of claim 13, wherein identifying the set of hypernym candidates further comprises identifying one or more user-context hypernyms based at least in part on one or more top-linked tags corresponding to a user.

18. A method for tagging text in a document for use in a knowledge and/or skills management technology platform, the method comprising:

programming a computer system comprising one or more physical processors with computer program instructions that, when executed by the one or more physical processors, program the computer system to perform the steps of:

executing, on a text segment of the text in the document, a tagging algorithm to generate one or more tag suggestions indicative of a relevant topic associated with the text segment, the tagging algorithm comprising a key phrase extraction component and a key phrase generation component, wherein executing the tagging algorithm comprises:

extracting, by the key phrase extraction component, a first set of one or more key phrase candidates in the text segment based at least in part on first relevance criteria;

generating, by the key phrase generation component, a second set of one or more key phrase candidates based at least in part on second relevance criteria, wherein the second set of one or more key phrase candidates do not appear in the text segment, and wherein generating, by the key phrase generation component, the second set of key phrase candidates comprises:

deriving a set of suggested hypernyms from a database of potential hyponym-hypernym pairs;

identifying a set of hypernym candidates from the set of suggested hypernyms, the identifying comprising identifying each suggested hypernym for which there are at least two associated hyponyms among the first set of key phrase candidates;

including the set of hypernym candidates in the second set of key phrase candidates; and selecting one or more hypernym candidates from the set of hypernym candidates for inclusion among the one or more tag suggestions based at least in part on the second relevance criteria; and applying a machine learning algorithm to create and store a knowledge and/or skills map that links a user to the topic indicated by the one or more tag suggestions and that indicates a user score for the user in relation to the topic.

19. The method of claim 18, wherein extracting the first set of key phrase candidates comprises:

splitting the text segment into one or more sentences;

obtaining a respective set of one or more tokens for each sentence; and applying a respective part-of-speech tag to each token, wherein each part-of-speech tag identifies a grammatical role of a respective one or more words in a corresponding sentence.

20. The method of claim 18, wherein executing the tagging algorithm further comprises:

filtering the first set of key phrase candidates based at least in part on filtering criteria to obtain a filtered set of key phrase candidates, wherein scoring the one or more extracted key phrase candidates comprises scoring the filtered set of key phrase candidates; and selecting one or more of the scored key phrase candidates determined to be most relevant to the topic.

21. The method of claim 18, wherein the second relevance criteria comprises at least one of: a total input key phrase coverage; a total number of occurrences of the at least two associated hyponyms in a language of the text segment; or a total number of page views of an online encyclopedia page corresponding to the suggested hypernym, and wherein selecting the one or more hypernym candidates for inclusion among the one or more tag suggestions comprises:

sorting the set of hypernym candidates sequentially based at least in part on the second relevance criteria; and iterating through the sorted set of hypernym candidates to select, for inclusion among the one or more tag suggestions, each hypernym candidate that covers at least one hyponym not covered by any previous hypernym candidate in the sorted set of hypernym candidates.

22. The method of claim 18, wherein identifying the set of hypernym candidates further comprises identifying one or more user-context hypernyms based at least in part on one or more top-linked tags corresponding to a user.

\* \* \* \* \*